US011946434B1

(12) United States Patent
Zimmerman

(10) Patent No.: US 11,946,434 B1
(45) Date of Patent: Apr. 2, 2024

(54) SYSTEM AND METHOD FOR ENCLOSING PISTON COOLING GALLERY

(71) Applicant: INNIO Waukesha Gas Engines Inc., Waukesha, WI (US)

(72) Inventor: Daniel David Zimmerman, Waterford, WI (US)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/107,463

(22) Filed: Feb. 8, 2023

(51) Int. Cl.
*E02F 3/16* (2006.01)
*F01P 3/06* (2006.01)
*F02F 3/16* (2006.01)

(52) U.S. Cl.
CPC . *F02F 3/16* (2013.01); *F01P 3/06* (2013.01)

(58) Field of Classification Search
CPC .. F02F 3/0015; F02F 3/08; F02F 3/045; F02F 3/04; F02F 3/16
See application file for complete search history.

(56) References Cited

U.S. PATENT DOCUMENTS 6,920,860 B2 7/2005 Gabriel et al.
7,415,959 B2 8/2008 Scharp
8,161,934 B2 4/2012 Scharp et al.
8,267,005 B2 9/2012 Scharp et al.
10,337,450 B2 7/2019 Laqua et al.
2010/0108001 A1 5/2010 Scharp et al.
2014/0345454 A1 11/2014 Wilder
2015/0354435 A1* 12/2015 Wirkkala, II ......... F02F 3/0015 123/41.35
2016/0222912 A1* 8/2016 Ni ............................. F02F 3/22
2019/0010892 A1* 1/2019 Lapp ......................... F02F 3/22

* cited by examiner

*Primary Examiner* — Abiy Teka
(74) *Attorney, Agent, or Firm* — Fletcher Yoder, P.C.

(57) ABSTRACT

A system includes a piston assembly. The piston assembly includes a crown portion having a crown, an outer wall coupled to the crown, a first inner wall disposed inside of the outer wall, a first fluid chamber disposed radially between the outer wall and the first inner wall, and an angled wall insert. An opening extends into the first fluid chamber in an axially inward direction. The outer wall, the first inner wall, the first fluid chamber, the opening, and the angled wall insert extend circumferentially about a central axis of the piston assembly. The angled wall insert is disposed in the opening, and the first fluid chamber is disposed axially between the crown and the angled wall insert.

21 Claims, 11 Drawing Sheets

SYSTEM AND METHOD FOR ENCLOSING PISTON COOLING GALLERY

STATEMENT REGARDING FEDERALLY SPONSORED RESEARCH & DEVELOPMENT

This invention was made with Government support under contract number DE-AR0001531 awarded by the Department of Energy (DOE). The Government has certain rights in the invention.

BACKGROUND

The subject matter disclosed herein relates to reciprocating pistons and, more specifically, to a system and method for enclosing a piston cooling gallery.

Pistons are used in a variety of machines, such as pumps, compressors, and internal combustion engines. The pistons may incorporate a cooling gallery to address high temperatures and/or temperature variations, particularly in internal combustion engines. For example, the pistons may form the cooling gallery with a casting or piston sections coupled together with bolts. Unfortunately, the casting adds significant weight to the pistons, and can cause thermal distortions in the pistons. The use of bolts also causes thermal distortions in the pistons. Accordingly, a need exists for an improved cooling gallery construction for a piston.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the present disclosure. Indeed, the present disclosure may encompass a variety of forms that may be similar to or different from the embodiments set forth below.

In certain embodiments, a system includes a piston assembly having a crown portion with a crown, an outer wall coupled to the crown, a first inner wall disposed inside of the outer wall, a first fluid chamber disposed radially between the outer wall and the first inner wall, and an angled wall insert. An opening extends into the first fluid chamber in an axial inward direction. The outer wall, the first inner wall, the first fluid chamber, the opening, and the angled wall insert extend circumferentially about a central axis of the piston assembly. The angled wall insert is disposed in the opening, and the first fluid chamber is disposed axially between the crown and the angled wall insert.

In certain embodiments, a method includes inserting an angled wall insert into an opening extending axially into a first fluid chamber of a piston assembly. The piston assembly includes a crown portion having a crown, an outer wall coupled to the crown, and a first inner wall disposed inside of the outer wall. The first fluid chamber is disposed radially between the outer wall and the first inner wall. Each of the angled wall insert, the opening, the first fluid chamber, the outer wall, and the first inner wall extend circumferentially about a central axis of the piston assembly. The first fluid chamber is disposed axially between the crown and the angled wall insert. The method also includes retaining the angled wall insert in the opening.

In certain embodiments, a system includes a piston assembly kit having at least one of a crown portion of a piston and an angled annular insert. The crown portion includes a crown, an annular outer wall, and an annular fluid chamber between the annular outer wall and a first inner wall. The annular fluid chamber includes an annular opening extending into the annular fluid chamber in an axial inward direction. The angled annular insert is configured to be received in the annular opening to form a wall of the annular fluid chamber.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
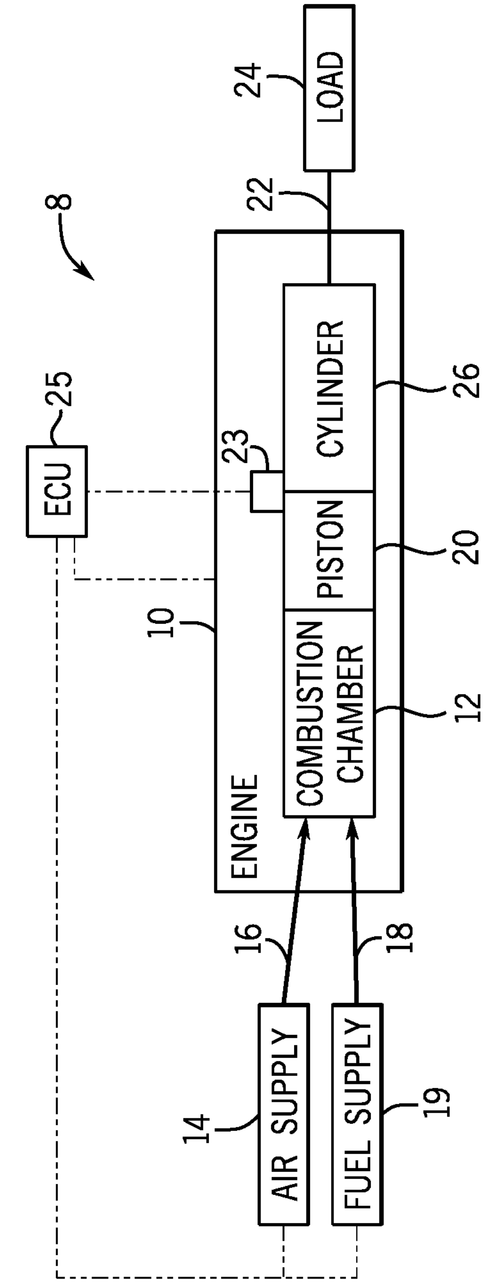
FIG. 1 is a schematic of an embodiment of a reciprocating engine coupled to a load in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments provide systems and methods for forming a cooling gallery in a piston in a manner that reduces the possibility of thermal distortions, reduces the piston weight, reduces the complexity of manufacturing, and generally improves the thermal performance of the piston. In particular, the cooling gallery may be formed without using any bolts, which could cause thermal distortions.

Additionally, the cooling gallery is formed with multiple sections, rather than a single integral casting, such that the piston can have a reduced weight as compared with the single integral casting. The cooling gallery also may be formed in association with a friction welding process, which is used to couple together sections of the piston.

For example, embodiments of the piston may include an angled wall insert (e.g., angled annular plate), a top portion (e.g., crown portion), and a lower or bottom portion (e.g., body portion, rod connecting portion, etc.) that couples with a piston rod. The piston may be used in any suitable machine, including but not limited to a reciprocating piston-cylinder engine, pump, or compressor. The top portion (e.g., crown portion) of the piston includes a crown, an outer wall coupled to the crown, a first inner wall, and a second inner wall. A first fluid chamber (e.g., cooling gallery) is disposed between an inner surface of the outer wall and an outer surface of the first inner wall. A second fluid chamber is disposed between an inner surface of the first inner wall and an outer surface of the second inner wall. In certain embodiments, the first and second fluid chambers direct the flow and/or collection of a fluid (e.g., oil) within the piston.

The angled wall insert (e.g., angled annular plate) is configured to fit inside the first fluid chamber of the piston, and may be used to impede an egress of the fluid. The angled wall insert may have a low thickness relative to the thicknesses of the surrounding components of the piston, thereby lessening the weight of the piston and potentially reducing the possibility of thermal distortion of the piston (e.g., ring grooves) over time. The angled wall insert may be angled acutely relative to a central axis of the piston, such that the angled wall insert (e.g., angled annular plate) changes in diameter over an axial length of the angled wall insert from a first axial end to a second axial end. The angled wall insert may be at least partially retained in the outer fluid chamber via an upward normal force exerted onto a wedge-shaped protrusion and a concurrent downward normal force exerted onto a curved slot, or vice versa. Additionally or alternatively, a range of the diameter of the angled wall insert may be configured to provide a radial biasing force between the angled wall insert and the opening of the outer fluid chamber when the angled wall insert is installed into the opening. In particular, a radial dimension of the angled wall insert may be greater than a corresponding radial dimension of the opening, such that the angled wall insert partially compresses in the radial direction when being installed into the opening in the outer fluid chamber of the piston. In this manner, a deformation may be applied to the angled wall insert until it matches the shape of the opening of the outer fluid chamber, resulting in a radial force which may be used to at least partially retain the angled wall insert inside the outer fluid chamber. However, in some embodiments, the angled wall insert may be radially spaced at an inner circumference (e.g., inner annular gap) and/or an outer circumference (e.g., outer annular gap), such than no radial forces are applied along the inner and outer circumferences of the angled wall insert.

In certain embodiments, the top portion (e.g., crown portion) and the body portion of the piston are friction welded together, such that a central axis of the top portion aligns with a central axis of the body portion. A weld flash (e.g., friction welding distortion, upset, bead, etc.) resulting from the friction welding of the two piston portions may be used to at least partially retain the angled wall insert in the first fluid chamber. For example, the weld flash may protrude from the first and second inner walls (e.g., inner and outer surfaces) of the piston near the location of the friction weldment interface. In some embodiments, the angled wall insert may be retained between the weld flash and a first mating portion (e.g., slot, groove, shoulder, protrusion, etc.) on the inner surface of the outer wall, a second mating portion (e.g., slot, groove, shoulder, protrusion, etc.) on the outer surface of the first inner wall, or a combination thereof. In this manner, movement of the angled wall insert in the axial direction of the piston may be blocked. However, in certain embodiments, the angled wall insert may be at least partially retained by a radial force and/or radial compression of the angled wall insert in the opening of the outer fluid chamber of the piston, a mating portion (e.g., slot, groove, shoulder, protrusion, etc.) in the opening, a separate weld (e.g., spot weld), the friction welding distortion, or any combination thereof. The angled wall insert thus may not form a complete seal with surfaces of the piston inside the opening, thereby allowing for a cooling flow through various gaps to improving cooling of the piston. The angled wall insert and construction of the piston are discussed in further detail below with reference to the drawings.

Turning to the drawings, FIG. 1 is a schematic of an embodiment of a reciprocating piston system 8. In certain embodiments, the reciprocating piston system 8 includes an engine 10 (e.g., a reciprocating piston-cylinder internal combustion engine or reciprocating engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. Any suitable oxidant may be used with the disclosed embodiments. The combustion chamber 12 is also configured to receive a fuel 18 (e.g., a liquid and/or gaseous fuel) from a fuel supply 19, and a fuel-air mixture ignites and combusts within each combustion chamber 12. The fuel 18 may be any suitable gaseous fuel, such as natural gas, associated petroleum gas, propane, biogas, sewage gas, landfill gas, coal mine gas, for example. The hot pressurized combustion gases cause a piston 20 adjacent to each combustion chamber 12 to reciprocate linearly or axially within a cylinder 26 and convert pressure exerted by the combustion gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator, a compressor, a pump, or other machinery.

The reciprocating piston system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine may also include any number of combustion chambers 12, pistons 20, and associated cylinders (e.g., 1-24). For example, in certain embodiments, the reciprocating piston system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. In certain embodiments, the engines may include Jenbacher Engines (e.g., Jenbacher Type 2, Type 3, Type 4, Type 6 or J920 FleXtra) or Waukesha Engines (e.g., Waukesha VGF, VHP, APG, 275GL) made by INNIO of Jenbach, Austria.

The driven power generation system 8 may include one or more sensors 23 communicatively coupled to an engine control unit (ECU) or controller 25. The sensors 23 may include temperature sensors, pressure sensors, flow rate sensors, fuel composition sensors, knock sensors, oxygen sensors, emissions sensors, or any combination thereof. For example, the knock sensors are suitable for detecting engine "knock." The emissions sensors may include nitrogen oxide (NOx) sensors, carbon oxide ($CO_X$) sensors, sulfur oxide ($SO_X$) sensors, or any combination thereof. The temperature, pressure, and flow rate sensors may be configured to monitor the temperature, pressure, and flow rate of a coolant and/or lubricant through the engine such as through the engine block, the valve head, the pistons 20 (e.g., through a cooling gallery in the pistons 20), or any combination thereof. During operation of the engine 10, signals from the sensors 23 are communicated to the controller 25 to evaluate various conditions of the engine 10 and adjust operating parameters of the engine 10, including but not limited to a coolant flow rate, a lubricant flow rate, a fuel injection quantity and/or timing, an ignition timing, a boost pressure of intake air into the engine or any combination thereof.

Figure 2:
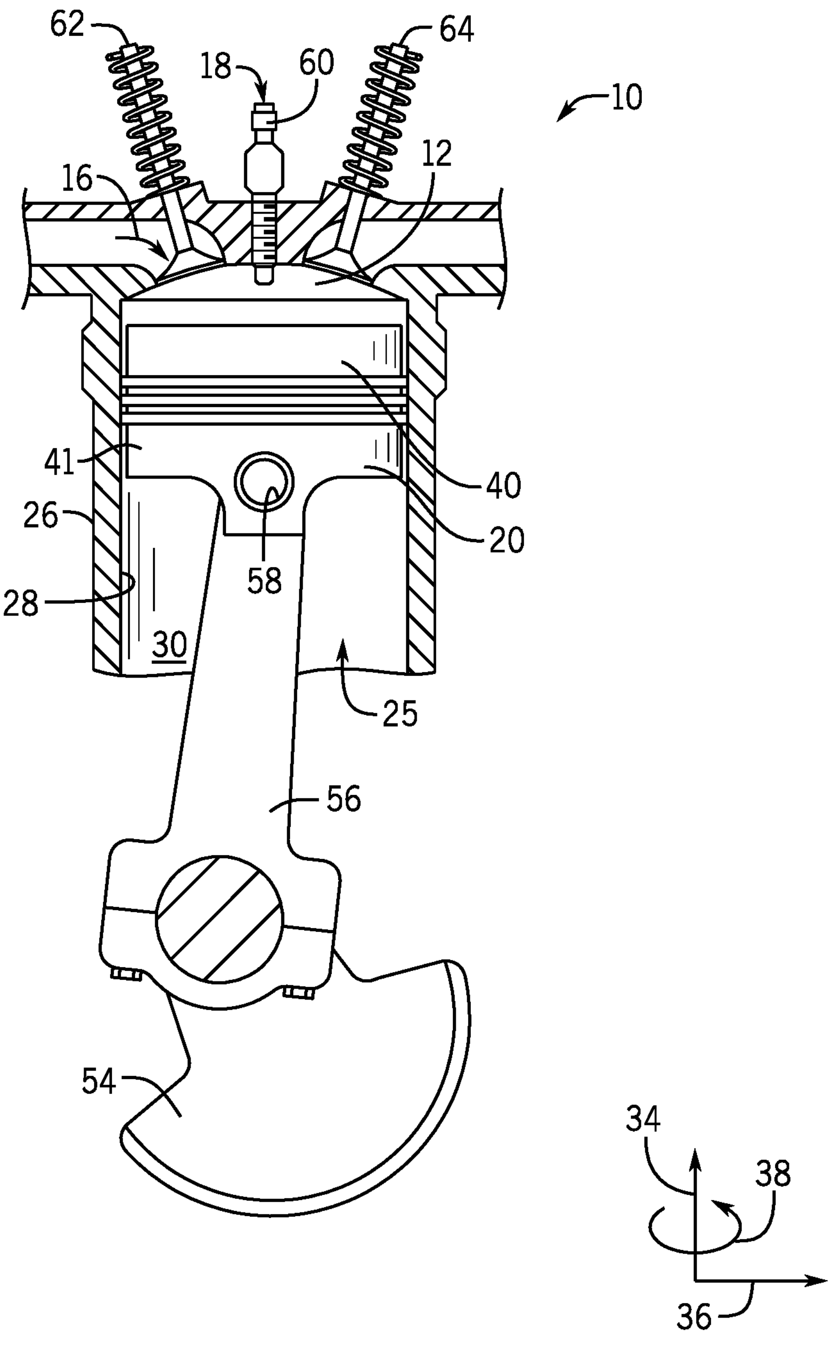
FIG. 2 is a cross-sectional side view of an embodiment of a piston within a cylinder of the reciprocating engine shown in FIG. 1 in accordance with aspects of the present disclosure.

FIG. 2 is a cross-sectional side view of an embodiment of a piston assembly having a piston 20 disposed within a cylinder 26 (e.g., an engine cylinder) of the engine 10. The cylinder 26 has an inner annular wall 28 defining a cylindrical cavity (e.g., bore). The piston 20 may be defined by an axial axis or direction 34, a radial axis or direction 36, and a circumferential axis or direction 38. The piston 20 includes an upper or top portion 40 (e.g., a top land or crown portion).

The top portion 40 generally blocks the fuel 18 and the air 16, or a fuel-air mixture, from escaping from the combustion chamber 12 during reciprocating motion of the piston 20. The piston also includes a lower, bottom, or body portion 41 coupled to the top portion 40. For example, as discussed in detail below, the portions 40 and 41 of the piston 20 may be coupled together via a friction welding process, resulting in a friction welded connection between the portions 40 and 41. Additionally, the coupling of the portions 40 and 41 of the piston 20 may help to define or form a cooling gallery in the piston 20.

As shown, the piston 20 is attached to a crankshaft 54 via a connecting rod 56 and a pin 58. The crankshaft 54 converts the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector provides the fuel 18 to the combustion chamber 12, and an intake valve 62 controls the delivery of air 16 to the combustion chamber 12. An exhaust valve 64 controls discharge of exhaust from the engine 10. However, any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26. During operations, when the piston 20 is at the highest point in the cylinder 26, it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

Figure 3:
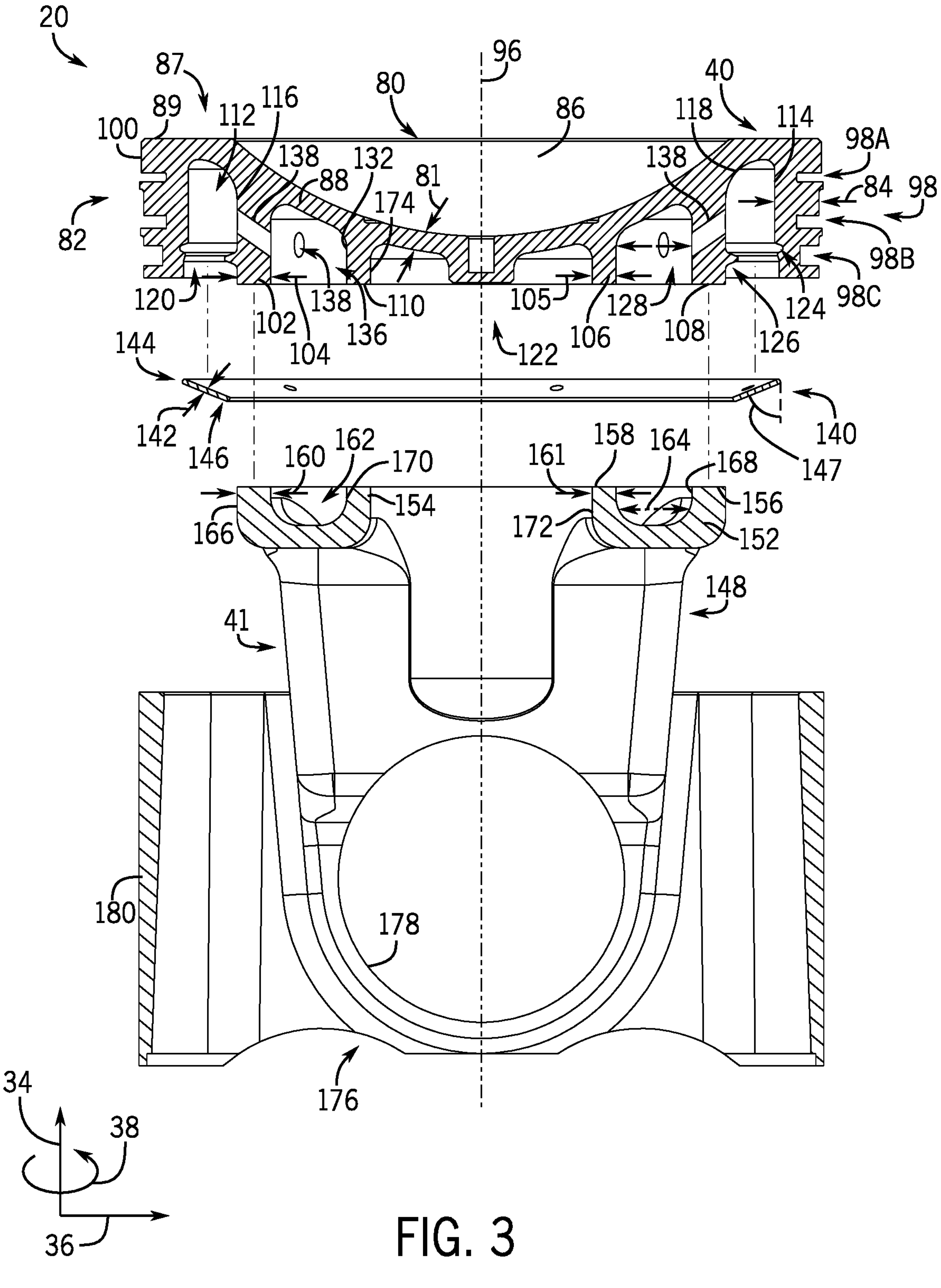
FIG. 3 is an exploded cross-sectional view of an embodiment of the piston shown in FIG. 2, wherein the piston includes a crown portion, an angled wall inert, and a body portion in accordance with aspects of the present disclosure.

FIG. 3 is an exploded cross-sectional view of an embodiment of the piston shown in FIG. 2, illustrating sections of the piston 20 prior to assembly. The sections of the piston 20 may include the top portion 40, the body portion 41, and an angled wall insert 140. The angled wall insert 140 may be an annular or substantially annular insert or plate, which is angled to define a frustoconical wall, a curved annular wall, or a combination thereof. As discussed in detail below, the angled wall insert 140 may be inserted into the top portion 40, wherein the angled wall insert 140 may be at least partially retained by a radial bias or radial compressive force on the angled wall insert 140 within the top portion 40, normal forces between top and bottom surfaces of the angled wall insert 140 and mating surfaces within the top portion 40, or a combination thereof. Additionally, the angled wall insert 140 may be at least partially retained by the assembly of the top and body portions 40 and 41, such as due to a material deformation associated with a friction welded joint between the top and body portions 40 and 41. Various aspects of the top portion 40, the body portion 41, and the angled wall insert 140 are discussed in detail below, followed by a detailed discussion of the assembly process (including friction welding).

The top portion 40 (e.g., crown portion) of the piston 20 includes a crown 80 coupled to an outer wall 82 (e.g., outer annular wall, ring belt, ring groove wall, or ring land wall), wherein the crown 80 generally faces axially toward the combustion chamber 12 and the outer wall 82 extends circumferentially around a central axis 96 of the piston 20. The outer wall 82 has a thickness 84 in the radial direction 36, while the crown 80 has a thickness 81 in the axial direction 34. As discussed in further detail below, a thickness 142 of the angular wall insert 140 is substantially less than the thickness 84 and 81, thereby helping to reduce weight and thermal distortions in the piston 20. The crown 80 includes a central concave portion 86 surrounded by a flat annular portion 87, wherein the concave portion 86 defines by a concave wall 88 and the flat annular portion 87 defines a flat annular wall 89. However, the crown 80 may have any suitable shape along a top surface of the piston 20. In some embodiments, at least part of the piston 20 (e.g., the crown 80) may be composed of stainless steel, while other parts of the piston 20 may be composed of lightweight metals (e.g., aluminum alloy).

In the illustrated embodiment, the outer wall 82 is configured to support a plurality of piston rings of the piston 20. For example, the outer wall 82 includes three ring grooves 98 to support respective piston rings on an outer surface 100 (e.g., outer annular surface) of the outer wall 82, although more or fewer ring grooves 98 and respective piston rings may be used in the piston 20. The first ring groove 98A supports a first piston ring (e.g., upper compression ring) configured to seal the combustion chamber 12 and contain the combustion gases. The second ring groove 98B supports a second piston ring (e.g., lower compression ring) configured to block any leakage from the first piston ring disposed in the first ring groove 98A. The third ring groove 98C supports a third piston ring (e.g., oil control ring) configured to block oil from leaking from the crankcase to the combustion chamber 12.

The top portion 40 of the piston 20 includes a plurality of walls and chambers to reduce weight and facilitate cooling of the piston 20. In the illustrated embodiment, the top portion 40 includes a first inner wall 102 (e.g., inner annular wall) of a thickness 104 and a second inner wall 106 (e.g., inner annular wall) of a thickness 105. The thicknesses 104 and 105 generally extend in the radial direction 36, similar to the thickness 84 of the outer wall 82. The first inner wall 102 and the second inner wall 106 include bottom surfaces 108 and 110 (e.g., axially facing surfaces), respectively. Each of the outer wall 82, the ring grooves 98 and associated piston rings, the first inner wall 102, and the second inner wall 106 extends in the circumferential direction 38 about the central axis 96 of the piston 20, thereby defining generally annular shapes for the respective components 82, 98, 102, and 106. In certain embodiments, the components 82, 98, 102, and 106 may have some deviations from annular while still being generally annular shapes.

The piston 20, when fully assembled, includes a plurality of fluid chambers defined at least partially by the top portion 40, the body portion 41, and the angled wall insert 140. The top portion 40 of the piston 20 includes a first fluid chamber 112 (e.g., outer fluid chamber, outer oil gallery, or outer cooling gallery) defined by an inner surface 114 (e.g., inner annular surface) of the outer wall 82, an outer surface 116 (e.g., outer annular surface) of the first inner wall 102, and a bottom surface 118 (e.g., axially facing surface) of the flat annular wall 89. An opening 120 (e.g., annular opening) extends in the axial direction 90 into the first fluid chamber 112, such that opening 120 fluidly couples the first fluid chamber 112 and a bottom side 122 of the top portion 40 of the piston 20 (e.g., prior to assembly of the piston 20). The inner surface 114 of the outer wall 82 includes a first mating portion 124 (e.g., annular retainer or retention structure), which extends circumferentially about the central axis 96 of the piston 20. Similarly, the outer surface 116 of the first inner wall 102 includes a second mating portion 126 (e.g., annular retainer or retention structure), which extends circumferentially about the central axis 96 of the piston 20. The first and second mating portions 124 and 126 are axially offset from one another in the axial direction 34 to accommodate the angled wall insert 140. For example, the first mating portion 124 may be axially recessed deeper into the first fluid chamber 112 than the second mating portion 126, or vice versa. Each of the first and second mating portions 124 and 126 may include an annular protrusion (e.g., annular lip or shoulder), an annular slot or groove, or a combination thereof. For example, in the illustrated embodiment, the first mating portion 124 includes an annular slot or groove, while the second mating portion 126 includes an annular protrusion. Each of the first fluid chamber 112, the opening 120, the first mating portion 124, and the second mating portion 126 extends in the circumferential direction 38 about the central axis 96 of the piston 20, thereby defining generally annular shapes for the respective components 112, 120, 124, and 126. In certain embodiments, the components 112, 120, 124, and 126 may have some deviations from annular while still being generally annular shapes.

The top portion 40 of the piston 20 includes a second fluid chamber 128 (e.g., inner fluid chamber, inner oil gallery, inner cooling gallery) defined by an inner surface 130 (e.g., inner annular surface) of the first inner wall 102, an outer surface 132 (e.g., outer annular surface) of the second inner wall 106, and the bottom surface 118 (e.g., axially facing surface) of the concave wall 88. The second fluid chamber 128 extends in the circumferential direction 38 about the central axis 96 of the piston 20, wherein the second fluid chamber 128 has a radial width 134. An opening 136 (e.g., annular opening) extends in the axial direction 34 into the second fluid chamber 128, such that the opening 136 fluidly couples the second fluid chamber 128 and the bottom side 122 of the top portion 40 of the piston 20 (e.g., prior to assembly of the piston 20). The opening 136 also extends in the circumferential direction 38 about the central axis 96 of the piston 20. The first inner wall 102 includes a plurality of fluid passages or holes 138 (e.g., disposed inside the first inner wall 102) extending in the radial direction 36, which fluidly couple the first fluid chamber 112 and the second fluid chamber 128. The holes 138 are spaced apart from one another circumferentially about the central axis 96. In the illustrated embodiment, the holes 138 are angled relative to the central axis 96, such that the holes 138 are directed deeper into the first fluid chamber 112 (e.g., toward the flat annular wall 89). In operation, a fluid flow (e.g., coolant and/or lubricant) may be routed into the second fluid chamber 128, through the holes 138, into the first fluid chamber 112, and out through openings in the angled wall insert 140 as discussed in further detail below.

The top portion 40 of the piston 20 is configured to receive the angled wall insert 140 in the opening 120 to further define the lower boundary of the first fluid chamber 112. The angled wall insert 140 may be annular or substantially annular, such that the angled wall insert 140 defines an angled annular wall insert, plate, or border of the first fluid chamber 112. For example, the angled wall insert 140 may include a frustoconical wall portion having a constant angle, a curved annular wall portion having a variable angle, or any combination thereof. In some embodiments, the angled wall insert 140 also may include a flat annular wall portion or disc-shaped portion oriented in a plane perpendicular to the central axis 96. However, the frustoconical wall portion and/or curved annular wall portion of the angled wall insert 140 may help to provide a radial bias or compressive fit of the angled wall insert 140 within the opening 120, an axial bias or compressive fit of the angled wall insert 140 between top and bottom surfaces of the angled wall insert 140 and mating surfaces within the opening 120, or a combination thereof. The angled wall insert 140 extends in the circumferential direction 38 about the central axis of the piston 20, thereby defining the annular or substantially annular shape of the angled wall insert 140.

The angled wall insert 140 is configured to be inserted into the opening 120 and contact or abut the first and second mating portions 124 and 126 (e.g., slot, groove, protrusion, shoulder, etc.). For example, the angled wall insert 140 may extend radially into an annular slot or groove of the first mating portion 124 and axially abut an annular protrusion of the second mating portion 126. In certain embodiments, during and after insertion into the opening 120, the angled wall insert 140 may be radially compressed between the outer wall 82 and the first inner wall 102, such that the angled wall insert 140 is self-biased in a radially outward direction into the annular slot or groove of the first mating portion 124 and a radially inward direction against the annular protrusion of the second mating portion 126 along the first inner wall 120. Additionally or alternatively, in certain embodiments, during and after insertion into the opening 120, the angled wall insert 140 may be axially captured and/or axially compressed between the first and second mating portions 124 and 126, such that normal forces exist between top and bottom surfaces of the angled wall insert 140 and mating surfaces of the first and second mating portions 124 and 126. The first and second mating portions 124 and 126 also may include angled or tapered surfaces (e.g., angled annular surfaces) with angles complementary to the angle of the angled wall insert 140. Collectively, the first fluid chamber 112 is disposed axially between the crown 80 (e.g., bottom surface 118) and the angled wall insert 140 and radially between the outer wall 82 and the first inner wall 120.

In certain embodiments, the thickness 142 of the angled wall insert 140 (e.g., angled annular plate) is less than: the thickness 84 of the outer wall 82 along the first fluid chamber 112, the thickness 81 of the crown 80 along the first fluid chamber 112, and the thickness 104 of the first inner wall 102 along the first fluid chamber 112. For example, the thickness 142 of the angled wall insert 140 may range from 1 to 4 mm, 1 to 3 mm, 1 to 2 mm, or 1.5 to 1.9 mm. By further example, the thickness 142 of the angled wall insert 140 may be less than or equal to 1, 2, 3, 4, or 5 mm. By further example, the thickness 142 of the angled wall insert 140 may be less than 5, 10, 15, 20, 30, 40, or 50 percent of the thickness 84, the thickness 81, and/or the thickness 104. In certain embodiments, the angled wall insert 140 is formed from sheet metal of a suitable gauge, such as 8, 9, 10, 11, 12, 14, 16, 18, or 20 gauge sheet metal. In certain embodiments, angled wall insert 140 is constructed of a metal, such as a stainless steel, a steel alloy, or other steel (e.g., stainless steel sheet metal). The low thickness 142 of the angled wall insert 140 may reduce the overall weight of the piston 20, thereby reducing manufacturing costs and also reducing the amount of energy used to move the piston 20 a given distance. Furthermore, the low thickness 142 of the angled wall insert 140 may assist in the reduction of thermal distortions (e.g., bending, buckling, etc.) of the ring grooves 98 on the outer surface 100 of the outer wall 82 for improving performance of the reciprocating piston system.

The angled wall insert 140 includes an outer portion 144 (e.g., outer annular portion, outer annular edge, or outer circumference) and an inner portion 146 (e.g., inner annular portion, inner annular edge, or inner circumference). The angled wall insert 140 may be angled at an angle 147 with respect to the central axis 96. For example, the angle 147 may be an acute angle greater than 0 and less than 90 degrees relative to the central axis 96 (e.g., 10, 20, 30, 40, 50, 60, 70, or 80 degrees plus or minus 5 degrees). For example, the angle 147 may be about 10 to 35 or 15 to 30 degrees. The angle 147 may be inclining or declining in an inward axial direction through the opening 120 into the fluid chamber 112. The angled wall insert 140 may be retained in the first fluid chamber 112 via engagement between the outer portion 144 of the angled wall insert 140 and the first mating portion 124 (e.g., first mating annular portion) along the inner surface 114 of the outer wall 82, engagement between the inner portion 146 and the second mating portion 126 (e.g., second mating annular portion) along the outer surface 116 of the first inner wall 102, or a combination thereof. Details pertaining to the structure of the angled wall insert 140 are provided in the description of FIG. 4. Details pertaining to the retention of the angled wall insert 140 in the first fluid chamber 112 are provided in the description of FIG. 7.

The piston 20 also includes the body portion 41 (e.g., body portion 148), which is configured to couple to the top portion 40 of the piston 20. The body portion 148 includes an outer wall 152 (e.g., outer annular wall) and an inner wall 154 (e.g., inner annular wall), which extend in the circumferential direction 38 about the central axis 96 of the piston 20, and include top surfaces 156 and 158 (e.g., axially facing annular surfaces), respectively. A thickness 160 of the outer wall 152 may be substantially the same as the thickness 104 of the first inner wall 102 of the top portion of the piston 20. A thickness 161 of the inner wall 154 may be substantially the same as the thickness 105 of the second inner wall 106 of the top portion 40 of the piston 20. The body portion 148 also includes a fluid cavity 162 (e.g., annular fluid cavity) disposed between the inner wall 154 and the outer wall 152, which also extends in the circumferential direction 38 about the central axis 96 of the piston 20. A radial width 164 of the fluid cavity 162 may be substantially the same as the radial width 134 of the second fluid chamber 128.

An outer surface 166 (e.g., outer annular surface) and an inner surface 168 (e.g., inner annular surface) of the outer wall 152 of the body portion 148 may be located at substantially the same radial distances from the central axis 96 as the outer surface 116 and the inner surface 130 of the first inner wall 102, respectively. Additionally, an outer surface 170 (e.g., outer annular surface) and an inner surface 172 (e.g., inner annular surface) of the inner wall 154 may be located at substantially the same radial distances from the central axis 96 as the outer surface 132 and an inner surface 174 of the second inner wall 106, respectively. In this manner, a coupling of the outer wall 152 with the first inner wall 102, and a concurrent coupling of the inner wall 154 with the second inner wall 106 may be achieved using friction welding or other fastening techniques. Similarly, the equivalency in radial dimensions enables the fluid cavity 162 to be concurrently fluidly coupled to the second fluid chamber 128, thereby forming a single chamber. The fluid cavity 162 may extend through the body portion 148 to enable a fluid flow through the piston 20, including the fluid cavity 162 and the fluid chambers 112 and 128.

The body portion 148 also may include a piston rod connection 176, which may include a pin receptacle or bore 178 configured to receive a pin to couple with a piston rod.

Additionally, the body portion 148 may include a skirt 180 (e.g., annular skirt or outer annular wall, or lower skirt portion) extending circumferentially about the central axis 96 in the axial direction 34. The illustrated skirt 180 is separate from the outer wall 82. However, in certain embodiments, the skirt 180 may extend directly from the outer wall 82. The skirts 180 and 82 may have the same or substantially the same outer diameters configured to fit within the cylinder 26 of the engine 10.

In certain embodiments, the outer wall 82 (e.g., the ring grooves 98 and the first mating portion 124), the first inner wall 102 (e.g., the outer surface 116, the inner surface 130, and the second mating portion 126), the second inner wall 106 (e.g., the outer surface 132, the inner surface 174), the first fluid chamber 112, the second fluid chamber 128, the bottom surface 118 of the crown 80, and the angled wall insert 140 (e.g., angled plate) may all be annular (e.g., circular) in shape with respect to the central axis 96 of the piston 20. In some embodiments, these components may not be perfectly annular, but may include one or more deviations from an annular shape.

Figure 4:
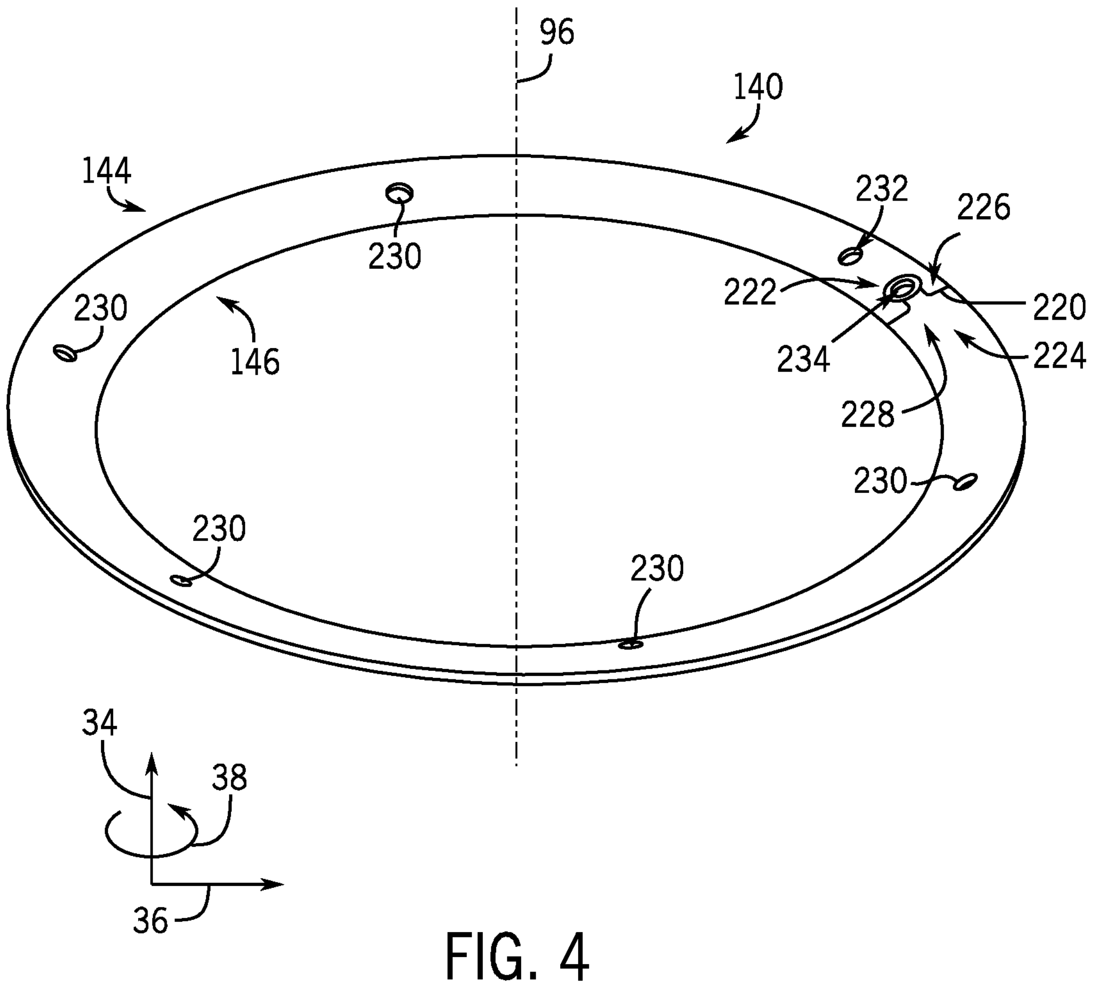
FIG. 4 is a perspective view of an embodiment of the angled wall insert shown in FIG. 3 in accordance with aspects of the present disclosure.

FIG. 4 is a perspective view of an embodiment of the angled wall insert 140 of FIG. 3. In certain embodiments, the angled wall insert 140 may be composed of a stainless steel, an alloy steel, or another suitable steel, wherein the angled wall insert 140 may be constructed from sheet metal. In the illustrated embodiment, the angled wall insert 140 (e.g., angled annular plate) is acutely angled relative to the central axis 96 of the piston 20. The angled wall insert 140 includes a split 220 between a first circumferential end portion 222 and a second circumferential end portion 224. The first circumferential end portion 222 includes a first interlock 226 and the second circumferential end portion 224 includes a second interlock 228. The first interlock 226 and the second interlock 228 are configured to couple together. The angled wall insert 140 also includes a plurality of fluid passages or holes 230 circumferentially spaced around the angled wall insert 140 at a substantial midpoint between the outer portion 144 and inner portion 146 of the angled wall insert 140. The circumferential spacing of the holes 230 may be non-uniform or uniform. The holes 230 may have the same or different shapes, diameters, angles, or any combination thereof. The illustrated embodiment depicts six holes, though it should be understood that fewer or more holes may be used. Due to the shape and thickness of the angled wall insert 140, the angled wall insert 140 is configured to expand/compress using a tool (e.g., a pair of pliers). For example, the circumference of the angled wall insert 140 may be configured to change by a substantial amount (e.g., 5, 10, or 15 mm) and the diameter of the angled wall insert 140 may be configured to change by a substantial amount (e.g., 1, 2, 3, 4, or mm) using a tool.

In certain embodiments, the angled wall insert 140 is angled relative to the central axis 96 (e.g., frustoconical wall), curved relative to the central axis 96 (e.g., curved annular wall), or a combination thereof. For example, the profile of the angled wall insert 140 between in the outer portion 144 and the inner portion 146 may be straight (e.g., angled relative to the central axis 96), curved (e.g., concave or convex curve), or a mixture of the two. In some embodiments, the profile of the angled wall insert 140 may be piecewise linear, that is, the profile may be angled differently in at least two different profile sections. For example, the angled wall insert 140 may include a plurality of frustoconical portions having different angles, a plurality of curved annular portions having different angles, or a combination thereof.

In certain embodiments, the first circumferential end portion 222 includes a first tool interface 232 and the second circumferential end portion 224 includes a second tool interface 234. The first tool interface 232 and the second tool interface 234 may be configured to engage with a tool (e.g., pliers) in order to radially compress or expand the angled wall insert 140. In certain embodiments, the first tool interface 232 and the second interface 234 may include tool holes or receptacles that are sized and spaced to enable a pair of pliers (e.g., or similar tool) to be inserted in the holes concurrently, thereby enabling compression or expansion of the angled wall insert 140 via depression or expansion of the pliers, respectively. However, in some embodiments, the first tool interface 232 and the second interface 234 may include tool engagement protrusions, such as lips, arms, or fins.

In certain embodiments, the first interlock 226 may include a male interlock or key structure and the second interlock 228 may include a female interlock or keyhole, or vice versa. For example, the first interlock 226 may include a convex portion (e.g., circular loop extending from an arm) and the second interlock 228 may include a concave portion (e.g., circular opening extending from a slot) configured to interlock with the convex portion. Alternatively, the first interlock 226 may include a concave portion and the second interlock 228 may include a convex portion configured to interlock with the concave portion. In some embodiments, an interlocking mechanism may be used to move the first circumferential end portion 222 relative to the second circumferential end portion 224. For example, the first circumferential end portion 222 may include a rack gear (e.g., straight gear) and the second circumferential end portion may include a pinion gear (e.g., circular gear) configured to engage the rack. The pinion gear may be configured to be turned using a tool (e.g., a screwdriver), thereby moving the pinion along the rack and expanding and/or compressing the angled wall insert 140.

In certain embodiments, a piston kit (e.g., angled wall insert 140 installation kit) may be used for joining the angled wall insert 140 with the top portion 40 of the piston 20. The piston kit may comprise at least one of the piston 20 (e.g., as described in relation to FIG. 3), the angled wall insert 140 (e.g., angled annular insert) configured to fit into an opening 120 (e.g., annular opening) to form a wall of the first fluid chamber 112 (e.g., annular fluid chamber), and a tool (e.g., pair of pliers) configured to install the angled wall insert 140 into the opening 120 of the first fluid chamber 112. In some embodiments, the piston kit may include one or more spare angled wall inserts 140, one or more fasteners for retaining the angled wall insert 140 inside the first fluid chamber 112, one or more spare tools, and/or one or more spare components (e.g., locking interfaces) of the angled wall insert 140.

Figure 5:
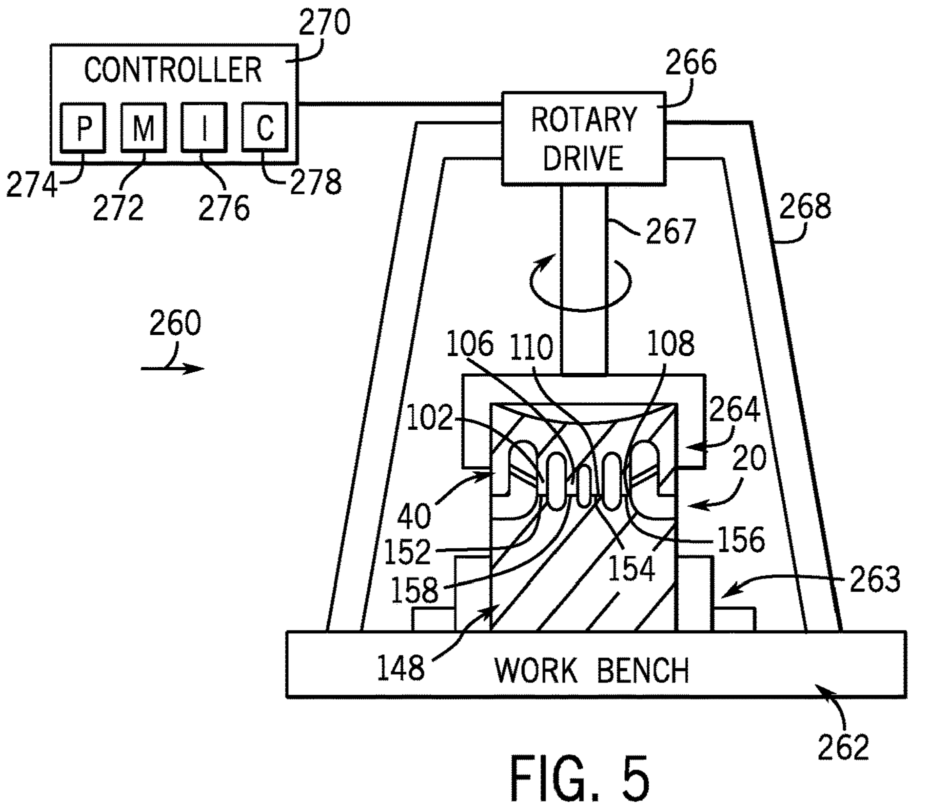
FIG. 5 is an embodiment of a friction welding assembly used for assembling the piston shown in FIG. 2 in accordance with aspects of the present disclosure.

FIG. 5 is an embodiment of a friction welding assembly 260 used for assembling the piston 20. The friction welding assembly 260 includes a work bench 262 having a clamp 263 configured to secure the body portion 148 of the piston 20 in a stationary position, and a clamp 264 configured to secure the top portion 40 (e.g., crown portion) of the piston 20 to a rotary drive 266, or vice versa. For example, in certain embodiments, the work bench 262 having the clamp 263 may be configured to secure the top portion 40 of the piston 20 in the stationary position, and the clamp 264 may be configured to secure the body portion 148 of the piston 20 to the rotary drive 266 via a shaft 267. The rotary drive 266 may be coupled to the work bench 262 via a moveable support 268, which may enable three-dimensional movements (e.g., X, Y, and Z directions) of the clamp 262 relative to the work bench 262 to adjust the position of the top portion 40 relative to the position of the body portion 148 of the piston 20. For example, the moveable support 268 may include first and second drive assemblies to move the rotary drive 266 and the clamp 262 in X and Y directions (e.g., horizontal directions) along a plane of the work bench 262, and a third drive assembly to move the rotary drive 262 and the clamp 262 in a Z direction (e.g., vertical direction) toward or away from the plane of the work bench 262.

Accordingly, in operation, the moveable support 268 is configured to align the top portion 40 and the body portion 148 of the piston 20, such that first inner wall 102 and second inner wall 106 of the top portion 40 align with the outer wall 152 and inner wall 154 of the body portion 148, respectively. The rotary drive 266 is configured to rotate the shaft 267, the clamp 264, and the top portion 40 of the piston 20 secured by the clamp 264, such that the top portion 40 rotates relative to the bottom portion 148 of the piston 20. While the rotary drive 266 rotates the top portion 40, the moveable support 268 is configured to lower and axially force the top portion 40 against the bottom portion 148 of the piston 20, thereby generating friction between the opposing rotating and stationary surfaces (e.g., 108 and 156, 110 and 158) of the top portion 40 and the bottom portion 148, respectively. The friction between the opposing rotating and stationary surfaces enables friction welding between the top portion 40 and the bottom portion 148 of the piston 20. The friction welding assembly 260 may also include a controller 270 communicatively coupled to the rotary drive 266 and the moveable support 268 (e.g., first, second, and third drive assemblies). The controller 270 may include a memory 272, a processor 274, instructions 276 stored on the memory 272 and executed by the processor 274, and communication circuitry 278. The controller 270 is configured to control a friction welding process for securing the top and body portions 40 and 148 by controlling the rotary drive 266 and the moveable support 268.

Figure 6:
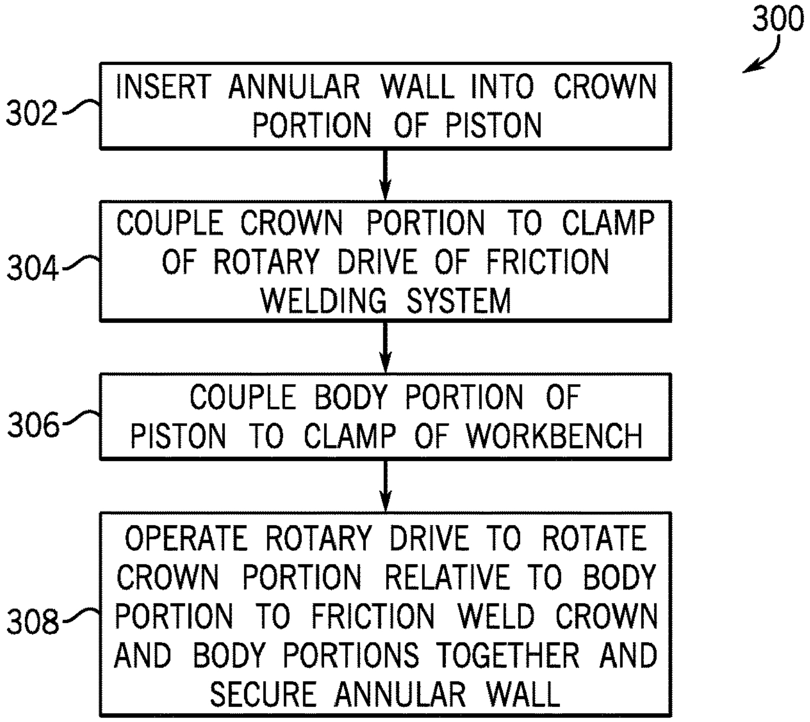
FIG. 6 is a flow chart showing an embodiment of a process for assembling the piston shown in FIG. 2 using the friction welding assembly shown in FIG. 3 in accordance with aspects of the present disclosure.

FIG. 6 is a flow chart of an embodiment of a process 300 for assembling the piston 20 using the friction welding assembly of FIG. 5. In block 302 of process 300, the angled wall insert 140 (e.g., annular wall insert) is inserted into the first fluid chamber 112 of the top portion 40 (e.g., crown portion) of the piston 20. In block 304, the top portion 40 of the piston 20 is coupled to the clamp 264 (e.g., coupled to rotary drive 266) of the friction welding assembly 260. In block 306, the body portion 148 of the piston 20 is coupled to the work bench 262 via the clamp 263 of the friction welding assembly 260. In block 308, the rotary drive 266 is operated (e.g., via the controller 270) to rotate the top portion 40 of the piston 20 relative to the body portion 148 while the bottom surfaces of the top portion 40 of the piston 20 make contact with the top surfaces of the body portion 148. The generation of friction results in a friction weld of the bottom surfaces of the top portion 40 to the top surfaces of the body portion 148, thereby coupling together the top and body portions 40 and 148 while also securing (e.g., retaining) the angled wall insert 140 (e.g. annular wall) inside the first fluid chamber 112 of the top portion 40.

In certain embodiments, prior to inserting the angled wall insert 140 into the first fluid chamber 112, the angled wall insert 140 is compressed or expanded (e.g., via compressing or expanding the first tool interface and second tool interface using a tool), such that the angled wall insert 140 fits inside the first fluid chamber 112. In some embodiments, the angled wall insert 140 may be compressed/expanded using the tool as the angled wall insert 140 is concurrently inserted into the first fluid chamber 112.

In certain embodiments, in response to the angled wall insert 140 making contact with either the first mating portion 124 (e.g., slot, groove, protrusion, shoulder, etc.) or second mating portion 126 (e.g., slot, groove, protrusion, shoulder, etc.), the tool may be released from the first tool interface and second tool interface. Upon the force exerted by the tool being removed, the angled wall insert 140 may expand radially outward from the central axis 96, such that the outer portion 144 of the angled wall insert 140 engages (e.g., slides into) the first mating portion 124 (e.g., slot, groove, channel, etc.) of the inner surface of the outer wall 82. In certain embodiments, upon removal of the tool, the angled wall insert 140 may compress radially inward toward the central axis 96, such that the inner portion 146 of the angled wall insert 140 engages the second mating portion 126 (e.g., slot, groove, channel, etc.) of the outer surface of the first inner wall 102. Alternatively or additionally, in certain embodiments, upon removal of the tool, the angled wall insert 140 may be axially captured and/or axially compressed between the first and second mating portions 124 and 126, such that normal forces exist between top and bottom surfaces of the angled wall insert 140 and mating surfaces of the first and second mating portions 124 and 126.

Figure 7:
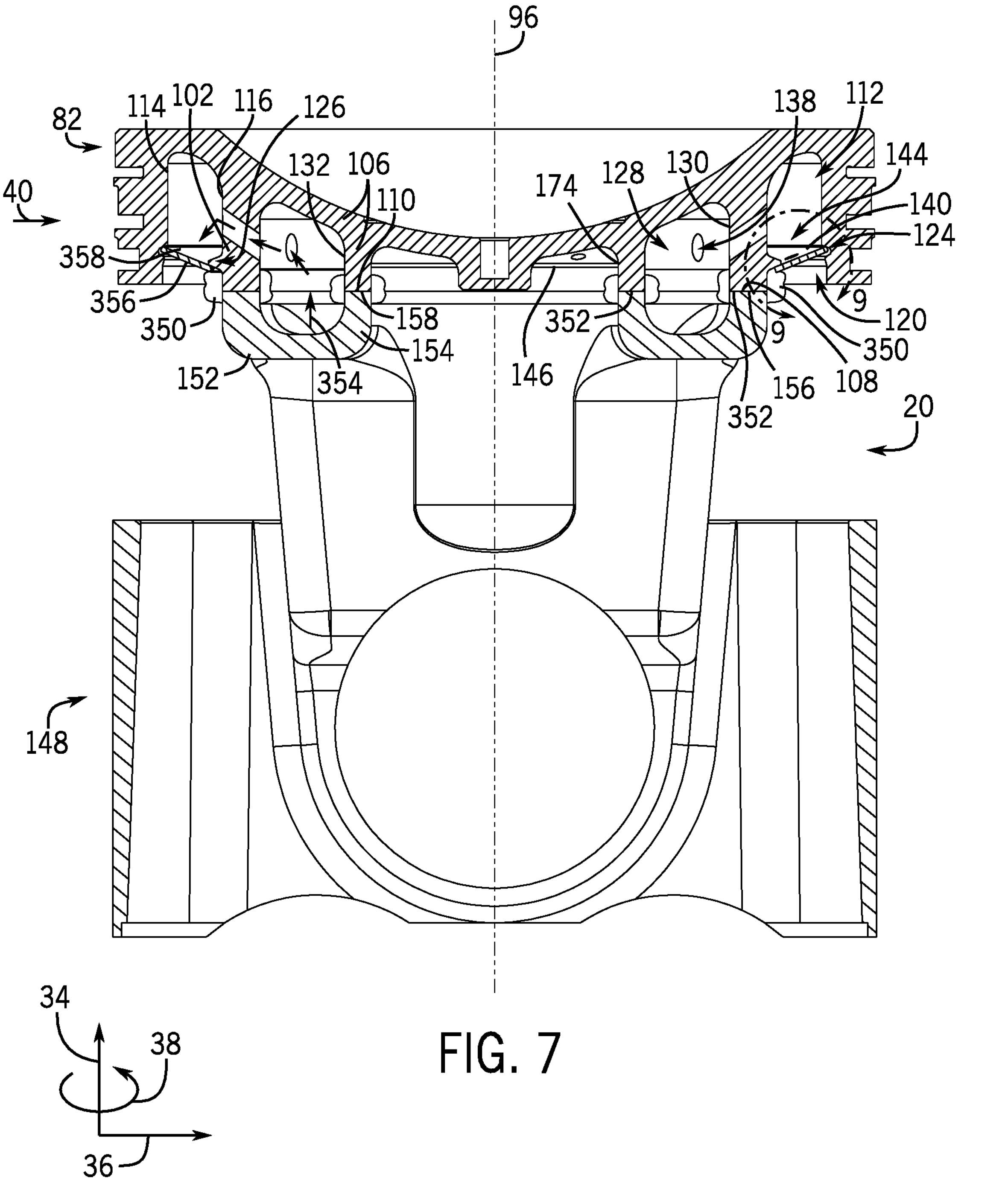
FIG. 7 is an assembled cross-sectional view of an embodiment of the piston assembly shown in FIG. 2 in accordance with aspects of the present disclosure.

FIG. 7 is an assembled cross-sectional view of an embodiment of the piston shown in FIG. 3. In the illustrated embodiment, the top portion 40 and the body portion 148 of the piston 20 are welded (e.g., friction welded) together via a joining of the first inner wall 102 of the top portion 40 with the outer wall 152 of the body portion 148, and the second inner wall 106 of the top portion 40 with the inner wall 154 of the body portion 148. As a result of the friction welding, weld joints or weld flashes 350 (e.g., friction weld distortion, annular weld protrusion or joint) form on inner surfaces 130 and 174 and outer surfaces 116 and 132, near a friction weldment interface 352, that is, where top surfaces 156 and 158 make contact with bottom surfaces 108 and 110, respectively. The arrows 354 represent the direction of fluid (e.g., lubricant such as oil) flow from the second fluid chamber 128, through the holes 138, into the first fluid chamber 112, and through the holes 230 in the angled wall insert 140 out of the first fluid chamber 112. In the illustrated embodiment, the angled wall insert 140 is at least partially retained in the first fluid chamber 112 via the weld flashes 350 associated with the friction weldment interface 352 between the top portion 40 and the body portion 148 of the piston 20. In certain embodiments, the weld flashes 350 may abut a bottom surface 356 (e.g., annular surface) of the angled wall insert 140 while the second mating portion 126 (e.g., annular protrusion, annular shoulder) concurrently abuts a top surface 358 (e.g., annular surface) of the angled wall insert 140. The angled wall insert 140 also may be retained in the first fluid chamber 112 via one or more additional retainers or retention features.

At the outer wall 82, the first mating portion 124 (e.g., annular groove or slot) retains the outer portion 144 (e.g., outer annular portion) of the angled wall insert 140, such that the outer portion 144 is axially captured within the first mating portion 124 to block axial separation of the outer portion 144 in the axial direction 34. In certain embodiments, the angled wall portion 140 is radially compressed within the first fluid chamber 112, such that the outer portion 144 is radially biased outwardly into the first mating portion 124 and/or the inner portion 146 is radially biased inwardly against the second mating portion 126. Alternatively or additionally, in certain embodiments, the angled wall insert 140 may be axially captured and/or axially compressed between the first and second mating portions 124 and 126.

In certain embodiments, one or more additional welded joints may be formed between the outer portion 144 and the first mating portion 124 and/or between the inner portion 146 and the second mating portion 126. However, the welded joints may or may not form a sealed interface between the outer portion 144 and the first mating portion 124 and/or between the inner portion 146 and the second mating portion 126. As a result, one more gaps (e.g., an annular gap or circumferentially spaced gaps) may exist between the outer portion 144 and the first mating portion 124 and/or between the inner portion 146 and the second mating portion 126, thereby providing fluid flow paths for the fluid (e.g., lubricant such as oil) to escape from the first fluid chamber 112 in addition to the holes 230.

In certain embodiments, the angled wall insert 140 may be at least partially retained in the first fluid chamber 112 of the piston 20 via a diagonally upward normal force exerted by the inner portion 146 of the angled wall insert 140 onto the second mating portion 126, and a diagonally downward normal force exerted by the outer portion 144 of the angled wall insert 140 onto the first mating portion 124, or vice versa. For example, the inner portion 146 of the angled wall insert 140 may exert an upward force on a protrusion (e.g., annular protrusion) of second mating portion 126 along the outer surface 116 of the first inner wall 102, such that the upward force is normal to a surface of the protrusion. Concurrently, the angled wall insert 140 may exert a downward force on a curved slot (e.g., annular slot) of the first mating portion 124 along the inner surface 114 of the outer wall 82, such that the downward force is normal to a surface of the curved slot. In certain embodiments, the angled wall insert 140 is at least partially retained via the upward and downward normal forces against the first and second mating portions 124 and 126, while radial gaps (e.g., annular gaps with a radial dimension) exist along inner and outer circumferences of the angled wall insert 140.

In certain embodiments, the angled wall insert 140 may be at least partially retained in the first fluid chamber 112 of the piston 20 via a first welded joint between the outer portion 144 (e.g., outer annular portion) of the angled wall insert 140 and the inner surface 114 of the outer wall 82, a second welded joint between the inner portion 146 (e.g., inner annular portion) of the angled wall insert 140 and the outer surface 116 of the first inner wall 102, or a combination thereof. For example, one or more weld joints may be used to retain (e.g., secure) the angled wall insert 140 inside the first fluid chamber 112 with or without retention via the weld flashes 350 from friction welding the top portion 40 to the body portion 148. In some embodiments, one or more welded joints (e.g., spot welds) may be used to retain the angled wall insert 140 prior to a friction welding procedure.

In certain embodiments, the angled wall insert 140 may be at least partially retained in the first fluid chamber 112 of the piston 20 via a first radial biasing force (e.g., expansive force) applied by the outer portion 144 of the angled wall insert 140 against the inner surface 114 of the outer wall 82, a second radial biasing force (e.g., compressive force) applied by the inner portion 146 of the angled wall insert 140 against the outer surface 116 of the first inner wall 102, or a combination thereof. In some embodiments, the angled wall insert 140 may be manufactured such that the diameter of the angled wall insert 140 is sized slightly larger than the diameter of the opening 120 of the first fluid chamber 112 in order to provide a compression fit (e.g., against the inner surface 114). In response to a deformation of the angled wall insert 140 (e.g. via a tool) in order to match the shape of the opening 120, a radial biasing force may be exerted by the angled wall insert 140 in a direction opposite the direction of the deformation. In some embodiments, the first radial biasing force, the second radial biasing force, or the combination thereof may be used to retain the angled wall insert 140 prior to a friction welding procedure. In other embodiments, the angled wall insert 140 may be retained via the first radial biasing force, the second radial biasing force, or the combination thereof without retention via the weld flashes 350, such that the angled wall insert 140 may be removable from the first fluid chamber 112.

In certain embodiments, the angled wall insert 140 may be at least partially retained in the first fluid chamber 112 (e.g., between the inner surface 114 of the outer wall 82 and the outer surface 116 of the first inner wall 102) via a friction interface, a radial force, the first mating portion 124 (e.g., annular groove, annular shoulder), the second mating portion 126 (e.g., annular groove, annular shoulder), normal forces between top and bottom surfaces of the angled wall insert 140 and opposing surfaces of the first and second mating portions 124 and 126, or a combination thereof. In some embodiments, the friction interface, the radial force, the first mating portion 124 (e.g., annular groove, annular shoulder), the second mating portion 126 (e.g., annular groove, annular shoulder), the normal forces, or the combination thereof may be used to retain the angled wall insert 140 prior to a friction welding procedure.

In certain embodiments, the outer portion 144 of the angled wall insert 140 may engage (e.g., without a radial force) the first mating portion 124 (e.g., outer portion 144 slides into annular groove) while the inner portion 146 of the angled wall insert 140 concurrently engages the second mating portion 126 of the outer surface 116 of the first inner wall 102. For example, the outer portion 144 may engage a groove (e.g., annular groove) on the inner surface 114 of the outer wall 82 while the inner portion 146 of the angled wall insert 140 engages an annular shoulder on the outer surface 116 of the first inner wall 102, such that movement of the angled wall insert 140 along the axial direction 34 may be impeded. In other embodiments, the inner portion 146 may engage a groove (e.g., annular groove) on the outer surface 116 of the first inner wall 102 while the outer portion 144 of the angled wall insert 140 engages an annular shoulder on the inner surface 144 of the outer wall 82, such that movement of the angled wall insert 140 along the axial direction 34 may be impeded. In some embodiments, the engagement between the outer portion 144 and the first mating portion 124 and a concurrent engagement between the inner portion 146 and the second mating portion 126 may be used to retain the angled wall insert 140 prior to a friction welding procedure.

In certain embodiments, the inner portion 146 of the angled wall insert 140 may exert a force radially inward against the outer surface 116 of the first inner wall 102, such that the inner portion 146 of the angled wall insert 140 engages the second mating portion 126, while the outer portion 144 of the angled wall insert 140 concurrently engages (e.g., no radial force exerted) the first mating portion 124 of the inner surface 114 of the outer wall 82. For example, the inner portion 146 of the angled wall insert 140 may exert a radially inward force, such that the inner portion 146 engages a groove on the outer surface 116 of the first inner wall 102, while the outer portion 144 of the angled wall insert 140 concurrently engages an annular shoulder on the inner surface 114. In this manner, movement of the angled wall insert 140 along the axial direction 34 may be impeded. In some embodiments, the engagement between the outer portion 144 and the first mating portion 124 and a concurrent radially inward force exerted by the inner portion 146 against the outer surface 116 (e.g., second mating portion 126) may be used to retain the angled wall insert 140 prior to a friction welding procedure.

In certain embodiments, the outer portion 144 of the angled wall insert 140 may exert a force radially outward against the inner surface 114 of the outer wall 82, such that the outer portion 144 of the angled wall insert 140 engages the first mating portion 124, while the inner portion 146 of the angled wall insert 140 concurrently engages (e.g., no radial force exerted) the second mating portion 126 of the outer surface 116 of the first inner wall 102. For example, the outer portion 144 of the angled wall insert 140 may exert a radially outward force, such that the outer portion 144 engages a groove on the inner surface 114 of the outer wall 82, while the inner portion 146 of the angled wall insert 140 concurrently engages an annular shoulder on the outer surface 116. In some embodiments, a radially outward force exerted by the outer portion 144 against the inner surface 114 (e.g., first mating portion 124) and a concurrent engagement between the inner portion 146 and the second mating portion 126 may be used to retain the angled wall insert 140 prior to a friction welding procedure.

Figure 8:
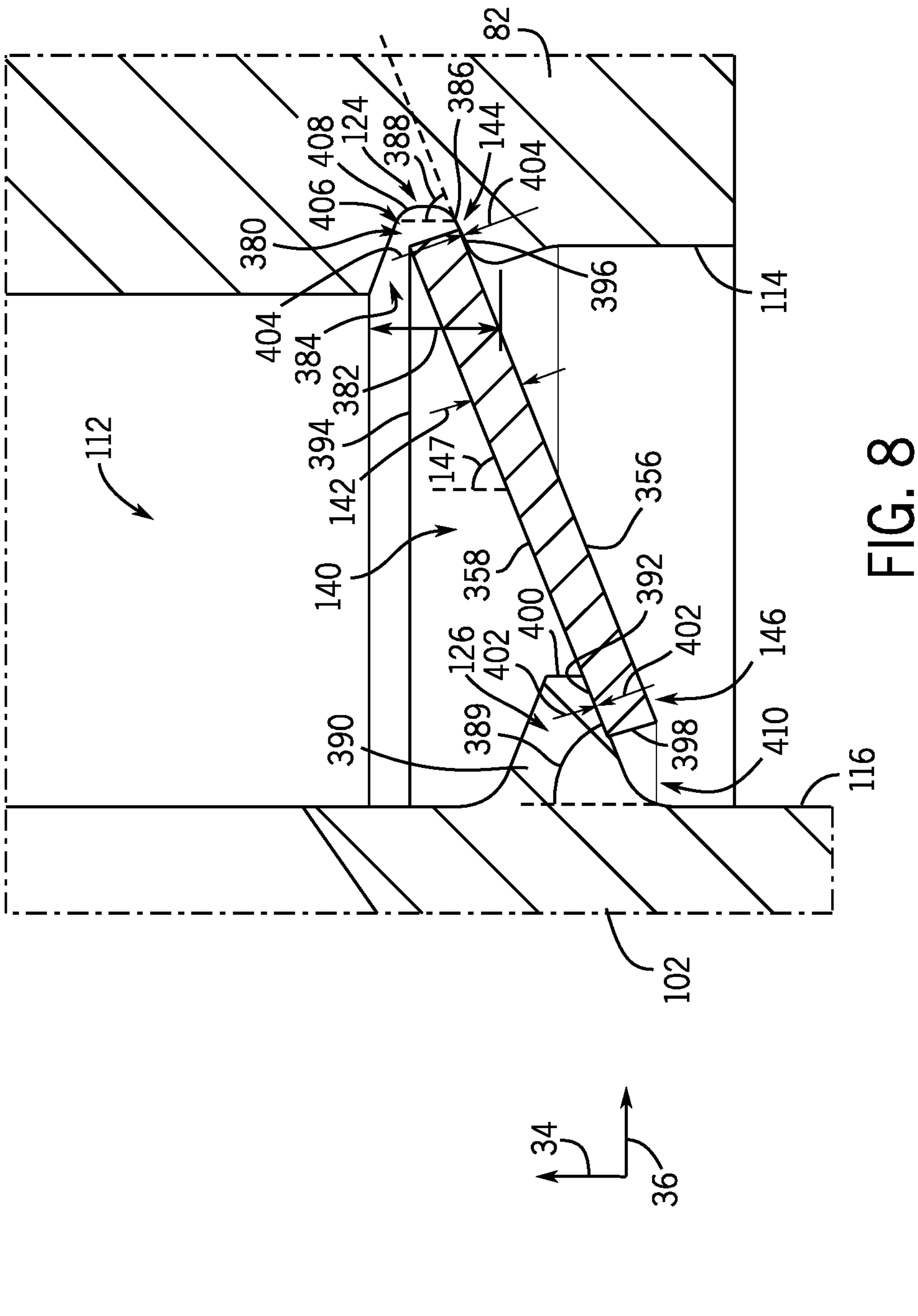
FIG. 8 is a partial cross-sectional view of an embodiment of the piston assembly of FIG. 7 prior to welding in accordance with aspects of the present disclosure.

FIG. 8 is a partial cross-sectional view of an embodiment of the piston 20 of FIG. 7, prior to the welding process 300 (or similar welding process). In the illustrated embodiment, the first mating portion 124 includes a curved slot 380 (e.g., annular curved slot). An axial dimension 382 (e.g., width) of an opening 384 (e.g., annular opening) of the curved slot 380 may be greater than the thickness 142 of the angled wall insert 140. The curved slot 380 includes a surface 386 (e.g., angled annular surface) at an angle 388 relative to the axial direction 34 (e.g., central axis). The surface 386 may include a frustoconical surface (e.g., constant angle 388) and/or a curved annular surface (e.g., variable angle 388 defining a curved profile). For example, the surface 386 may be angled at the angle 388 to mate with the angled wall insert 140. The second mating portion 126 may be a wedge-shaped protrusion 390 (e.g., annular wedge-shaped protrusion or angled annular protrusion). A surface 392 (e.g., angled annular surface) of the wedge-shaped protrusion 390 is oriented at an angle 389 relative to the axial direction 34. The angles 388 and 389 may be the same or different from one another, depending on the construction of the angled wall insert 140. For example, in the illustrated embodiment, the angled wall insert 140 may be a frustoconical wall insert 140 having a constant angle 147, and thus the angles 388 and 389 may be the same as one another and the same as the angle 147 of the angled wall insert 140. In other embodiments, the angled wall insert 140 may have a variable angle 147, and thus the angles 388 and 389 may be different from another. In certain embodiments, the angles 388 and 389 may be substantially the same as the angle 147 of the angled wall insert 140 at the contact interface between the angled wall insert 140 and the respective mating portions 124 and 126.

In the illustrated embodiment, the first mating portion 124 is offset from the second mating portion 126 in the axial direction 34, such that the first mating portion 124 is located at a greater axial position relative to the second mating portion 126 or, in certain embodiments, vice versa, relative to the axial direction 34. The first mating portion 124 and the second mating portion 126 are sized and/or positioned such that an outer circumference 394 (e.g., of the outer portion 144) of the angled wall insert 140 radially 36 exceeds an inner boundary 396 of the surface 386 of the curved slot 380, while an inner circumference 398 (e.g., of the inner portion 146) of the angled wall insert 140 radially 36 exceeds a chamfered surface 400, which demarcates an outer boundary of the surface 392 of the wedge-shaped protrusion 390. In this manner, the first mating portion 124 and second mating portion 126 enable a first surface contact (e.g., annular interface) between the bottom surface 356 of the angled wall insert 140 and the surface 386 of the curved slot 380 (e.g., overlapping surfaces 356 and 386), and a second surface contact (e.g., annular interface) between the top surface 358 of the angled wall insert 140 and the surface 392 of the wedge-shaped protrusion 390 (e.g., overlapping surfaces 358 and 392).

In the illustrated embodiment, the angled wall insert 140 is at least partially retained via the first surface contact with the curved slot 380 and the second surface contact with the wedge-shaped protrusion 390. The top surface 358 of the angled wall insert 140 may be biased against the surface 392 of the wedge-shaped protrusion 390, such that opposite normal forces 402 exist between the surfaces 358 and 392. Similarly, the bottom surface 356 of the angled wall insert 140 may be biased against the surface 386 of the curved slot 380, such that opposite normal forces 404 exist between the surfaces 356 and 386. The normal forces 402 and 404 may be caused by a change in the angle 147 of the angled wall insert 140 as the angled wall insert 140 is inserted and partially deflected or deformed to engage with the first mating portion 124 and second mating portion 126. For example, the illustrated embodiment, the angle 147 may be initially less than the angles 388 and 389 prior to installation of the angled wall insert 140 relative to the first and second mating portions 124 and 126, such that the angle 147 is generally increased during installation against the first and second mating portions 124 and 126. In certain embodiments, the change (e.g., increase) in the angle 147 of the angled wall insert 140 during installation against the first and second mating portions 124 and 126 may be greater than 0 and less than approximately 0.1, 0.2, 0.3, 0.5, 0.6, 0.7, 0.8, 0.9, 1, 2, 3, 4, or 5 degrees.

For example, prior to being inserted into the first fluid chamber 112, the angle 147 of the angled wall insert 140 may be 74 degrees relative the axial direction 34. In response to engaging the first mating portion 124 and second mating portion 126, the inner portion 146 of the angled wall insert 140 may be deflected downward and/or the outer portion 144 may be defected upward, causing the angle 147 to increase, for example, to 75 degrees. The change in the angle 147 of the angled wall insert 140 may result in the angled wall insert 147 being at least partially retained by the normal forces 402 and 404. The change in the angle 147 also may be described as generating a self-biasing force, a spring force, or a pre-load to generate the normal forces 402 and 404. In other words, the angled wall insert 140 may be axially captured and axially compressed in the axial direction 34 (e.g., causing an increase in the angle 147 and increase in axial height of the angled wall insert 140), as the angled wall insert 140 is inserted between the first and second mating portions 124 and 126. Additionally, the contact between the overlapping surfaces 356 and 386 and the contract between the overlapping surfaces 358 and 392 may generate frictional forces, which further help to retain the position of the angled wall insert 140.

In the illustrated embodiment, a gap 406 (e.g., an annular gap having a radial dimension) exists between the outer circumference 394 of the angled wall insert 140 and an outermost surface 408 of the curved slot 380. Similarly, in the illustrated embodiment, a gap 410 (e.g., an annular gap having a radial dimension) exists between the inner circumference 398 of the angled wall insert 140 and the outer surface 116 of the first inner wall 102. Accordingly, in the illustrated embodiment, the angled wall insert 140 does not radially contact the outermost surface 408 of the curved slot 380 or the outer surface 116 due to the gaps 406 and 410, such that the angled wall insert 140 may not exert radial biasing forces in the radial direction 36 onto the inner surface 114 of the outer wall 82 or outer surface 116 of the first inner wall 102 (e.g., radially inward biasing force and radially outward biasing force). The gaps 406 and 410 may be designed to enable some thermal expansion or contraction of the piston 20 and/or the angled wall insert 140 without causing radial contact during operating of the engine 10. Thus, the angled wall insert 140 may still undergo radial deformation, such that the diameter of the angled wall insert 140 increases in response to the outer portion 144 of the angled wall insert 140 sliding into the curved slot 380 during the insertion of the angled wall insert 140 into the first fluid chamber 112. It may be appreciated that the absence of a radial biasing force exerted by the angled wall insert 140 against either the outer surface 116 or inner surface 114 may help prevent distortions of the ring grooves 98.

Figure 9:
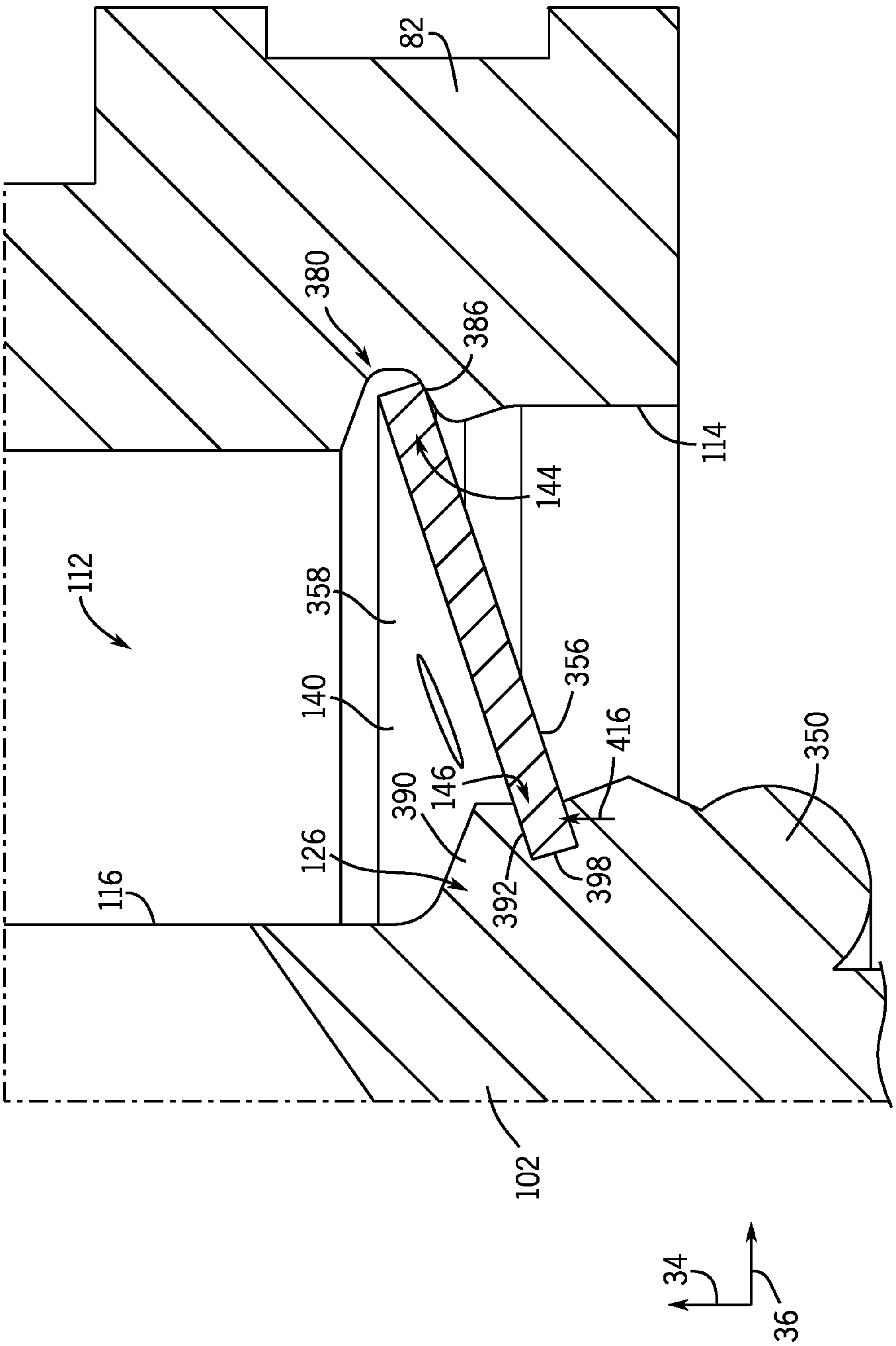
FIG. 9 is a partial cross-sectional view of an embodiment of the piston assembly of FIG. 7 after welding in accordance with aspects of the present disclosure.

FIG. 9 is a partial cross-sectional view of an embodiment of the piston 20 of FIG. 7, after the welding process 300 (or similar welding process). As a result of the welding process 300, the inner portion 146 of the angled wall insert 140 is axially captured and/or axially compressed between the second mating portion 126 (e.g., wedge-shaped protrusion 390) and the weld flash 350 (e.g., annular weld protrusion or deformation). For example, in certain embodiments, the weld flash 350 abuts the bottom surface 356 of the inner portion 146 of the angled wall insert 140. In the illustrated embodiment, the weld flash 350 engulfs the inner circumference 398 of the angled wall insert 140. The weld flash 350 abuts the bottom surface 356 of the angled wall insert 140 as top surface 358 of the angled wall insert 140 makes concurrent contact with the surface 392 of the wedge-shaped protrusion 390. The weld flash 350 thereby exerts an upward force 416 onto the angled wall insert 140.

In certain embodiments, the upward force 416, the normal force 402, and the normal force 404 at least partially or completely retain the angled wall insert 140 in the first fluid chamber 112. The bottom surface 356 of the angled wall insert 140 may make contact with the surface 386 of the curved slot 380 and/or exert the normal force 404 after the welding process 300. In certain embodiments, the bottom surface 356 may no longer make contact with the surface 386 of the curved slot 380 after the welding process 300.

Figure 10:
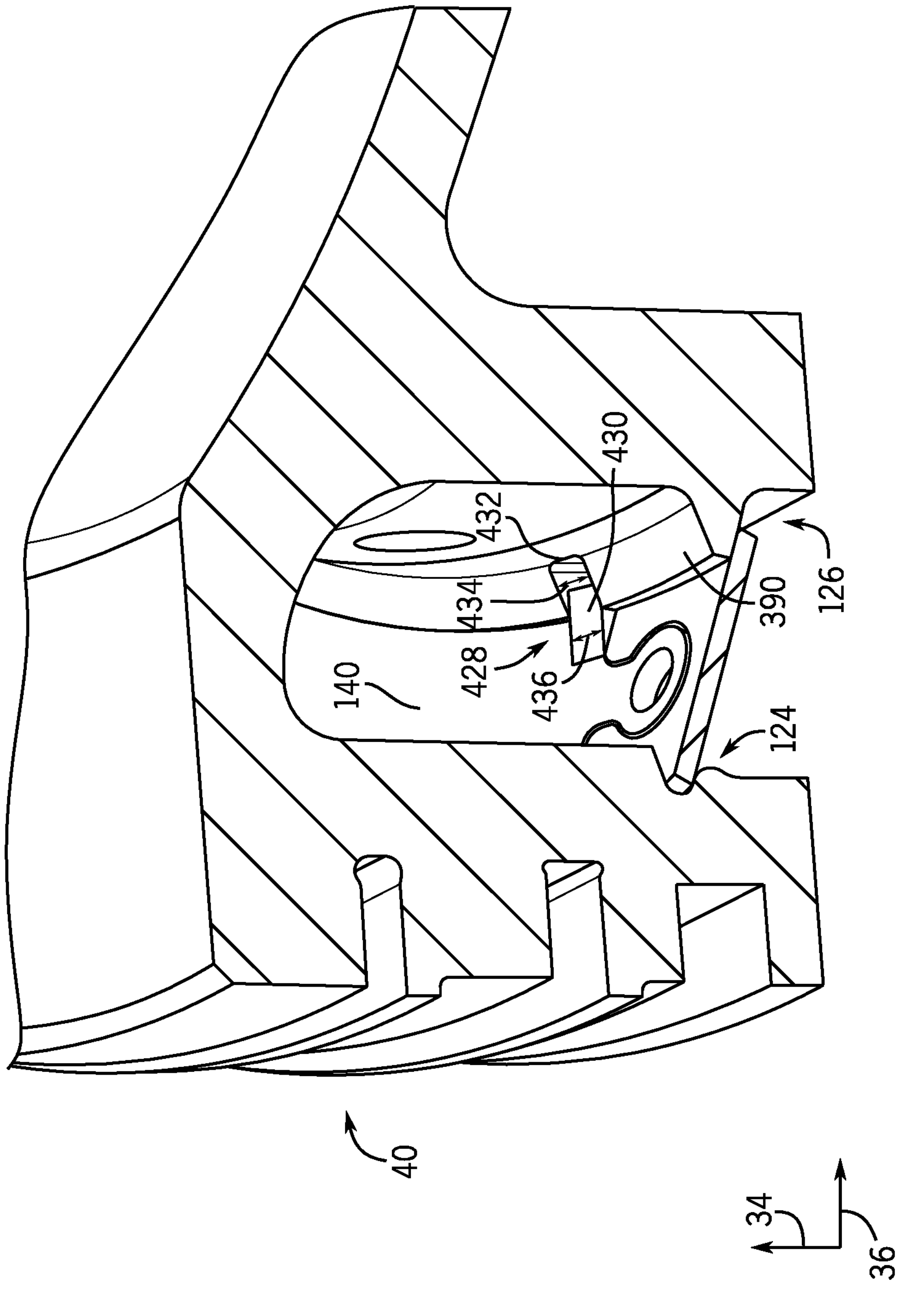
FIG. 10 is a partial cutaway view of an embodiment of the piston assembly of FIGS. 7 and 8 prior to welding in accordance with aspects of the present disclosure.

FIG. 10 is a partial cutaway view of an embodiment of the piston 20 of FIG. 7, prior to the welding process 300 (or similar welding process), illustrating an anti-rotation interface 428 between the angled wall insert 140 and the piston 20. The anti-rotation interface 428 may include mating male and female anti-rotation features, such as oriented in the axial direction 34 and/or the radial direction 36. In the illustrated embodiment, the angled wall insert 140 includes an anti-rotation tab 430. The anti-rotation tab 430 includes a cut section (e.g., bent tab between parallel cuts) of the inner portion 146 of the angled wall insert 140 bent upward (e.g., in the axial direction 34). The anti-rotation tab 430 is configured to engage an axial slot 432 of the wedge-shaped protrusion 390. A width 434 of the axial slot 432 is defined by a width 436 of the anti-rotation tab 430, such that the anti-rotation tab 430 fits inside the axial slot 432. In certain embodiments, the anti-rotation tab 430 may form a press fit with the axial slot 432, such that both outer surfaces of the anti-rotation tab 430 make concurrent surface contact with the inner surfaces of the axial slot 432, thereby blocking rotation (e.g., vibration) of the angled wall insert 140 relative to the top portion 40 of the piston 20.

The anti-rotation interface 428 also may include one or more other configurations to provide anti-rotation of the angled wall insert 140 relative to the piston 20. In some embodiments, the anti-rotation tab 430 may be formed by an added material, such as an added block, wedge, arm, or other radial protrusion. Alternatively or additionally, in some embodiments, the anti-rotation interface 428 may include the anti-rotation tab 430 on the second mating portion 126 and the axial slot 432 on the angled wall insert 140. Alternatively or additionally, in some embodiments, the anti-rotation interface 428 may include the anti-rotation tab 430 on the first mating portion 124 and the axial slot 432 on the angled wall insert 140. Alternatively or additionally, in some embodiments, the anti-rotation interface 428 may include the axial slot 432 on the first mating portion 124 and the anti-rotation tab 430 on the angled wall insert 140.

Figure 11:
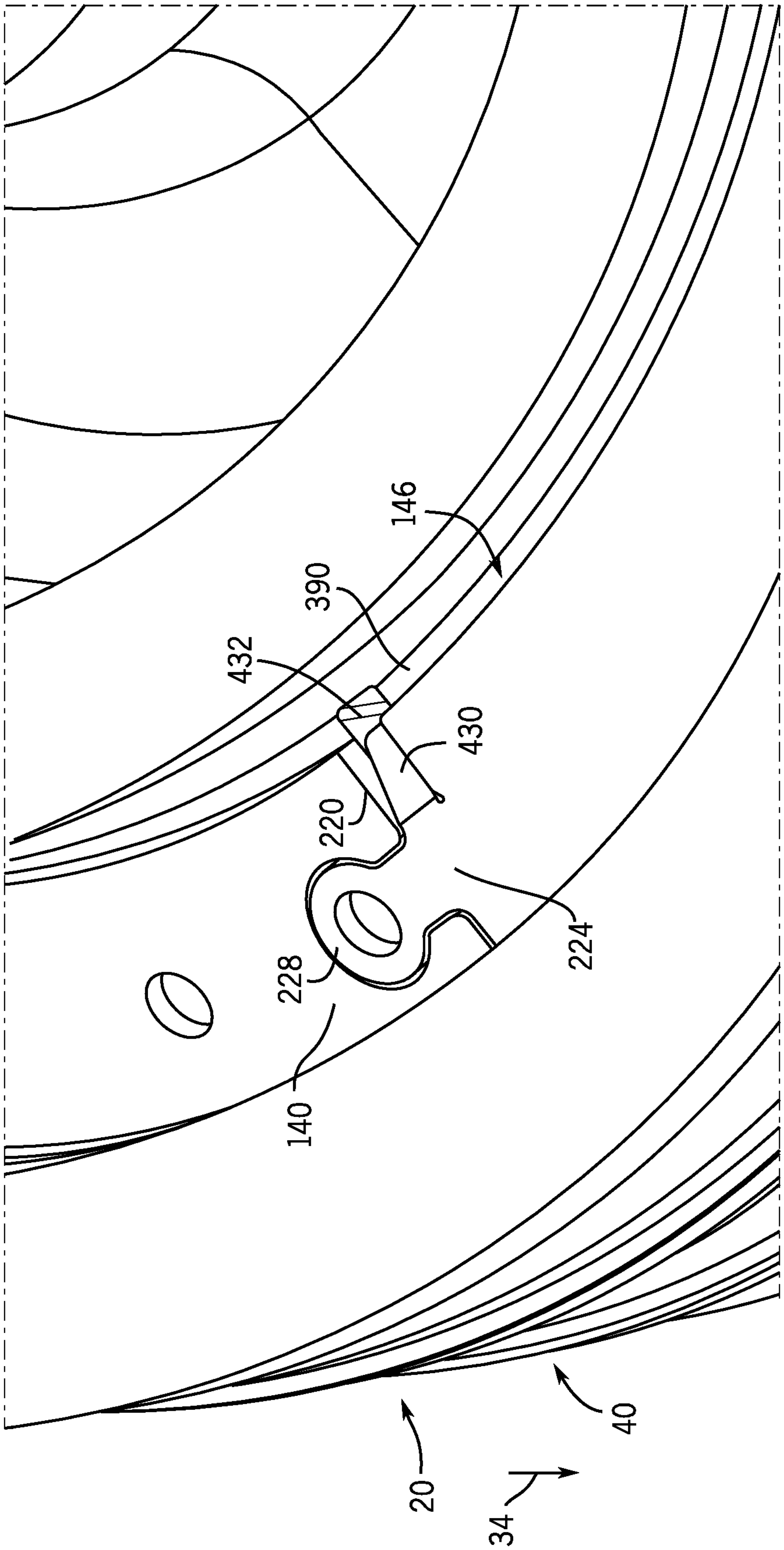
FIG. 11 is a partial perspective view of an embodiment of the piston assembly in accordance with aspects of the present disclosure.

FIG. 11 is a partial perspective view of an embodiment of the piston 20, further illustrating details of the anti-rotation interface 428 in accordance with aspects of the present disclosure. In the illustrated embodiment, the anti-rotation tab 430 is shown as a bent section of the inner portion 146 of the angled wall insert 140, e.g., bent in the axial direction 34 to an acute angle relative to the angled wall insert 140. The anti-rotation tab 430 is configured to engage (e.g., insert, slide into) the axial slot 432 of the wedge-shaped protrusion 390, thereby blocking rotation of the angled wall insert 140 relative to the top portion 40 of the piston 20. In the illustrated embodiment, the anti-rotation tab 430 is proximate to the second interlock 228 of the second circumferential end portion 224 of the angled wall insert 140. In certain embodiments, the anti-rotation tab 430 may be located somewhere else on the inner portion 146 of the angled wall insert 140 (e.g., diametrically opposite the split 220).

Figure 12:
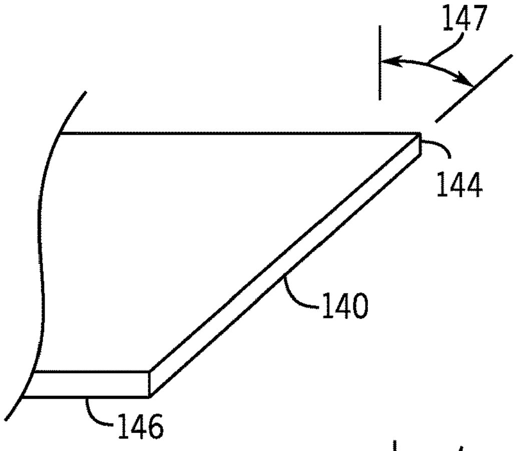
FIG. 12 is a partial cross-sectional view of an embodiment of the angled wall insert, illustrating a frustoconical shape.

FIG. 12 is a partial cross-sectional view of an embodiment of the angled wall insert 140, illustrating the angle 147 (e.g., acute angle) of the angled wall insert 140 relative to the central axis 96 of the piston 20. In the illustrated embodiment, the angle 147 of the angled wall insert 140 is constant from the inner portion 146 to the outer portion 144. For example, the angle 147 may be approximately 20, 30, 40, 45, 50, 60, or 70 degrees, plus or minus 5 degrees. The angled wall insert 140 of FIG. 12 may be described as a frustoconical wall insert. In some embodiments, the angle 147 may be variable between the inner portion 146 and the outer portion 144. Although the illustrated embodiment shows the outer portion 144 having a greater radial distance (e.g., with respect to central axis 96) than the inner portion 146, in certain embodiments the outer portion 144 may have a smaller radial distance than the inner portion 146, such that the angle 147 is greater than 90 degrees. For example, the angled wall insert 140 may be inserted in an axially opposite configuration into the opening 120, such that the inner portion 146 is inserted first followed by insertion of the outer portion 144, wherein the orientation of the first and second mating portions 124 and 126 is similarly reversed in the axial direction to accommodate the angled wall insert 140. In other words, the angle 147 may be inclining or declining in an inward axial direction through the opening 120 into the fluid chamber 112.

Figure 13:
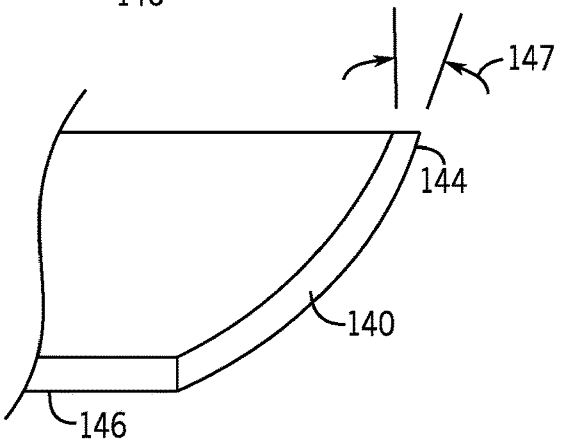
FIG. 13 is a partial cross-sectional view of an embodiment of the angled wall insert, illustrating an inwardly curved annular shape.

FIG. 13 is a partial cross-sectional view of an embodiment of the angled wall insert 140, illustrating the angle 147 of the angled wall insert 140 varying between the inner portion 146 and the outer portion 144. In the illustrated embodiment, the angle 147 gradually decreases from the inner portion 146 to the outer portion 144. The angled wall insert 140 of FIG. 13 may be described as a curved annular wall insert (e.g., an inwardly curved annular wall insert or a concave annular wall insert). Although the illustrated embodiment shows the outer portion 144 having a greater radial distance (e.g., with respect to central axis 96) than the inner portion 146, in certain embodiments the outer portion 144 may have a smaller radial distance than the inner portion 146, such that the angle 147 is greater than 90 degrees. For example, the angled wall insert 140 may be inserted in an axially opposite configuration into the opening 120, such that the inner portion 146 is inserted first followed by insertion of the outer portion 144, wherein the orientation of the first and second mating portions 124 and 126 is similarly reversed in the axial direction to accommodate the angled wall insert 140. In other words, the angle 147 may be inclining or declining in an inward axial direction through the opening 120 into the fluid chamber 112.

Figure 14:
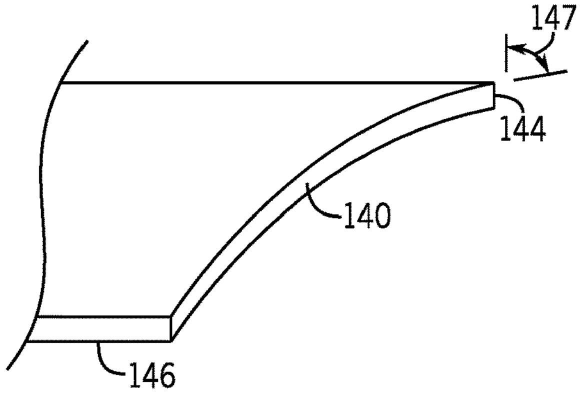
FIG. 14 is a partial cross-sectional view of an embodiment of the angled wall insert, illustrating an outwardly curved annular shape.

FIG. 14 is a partial cross-sectional view of an embodiment of the angled wall insert 140, illustrating the angle 147 of the angled wall insert 140 varying between the inner portion 146 and the outer portion 144. In the illustrated embodiment, the angle 147 gradually increases from the inner portion 146 to the outer portion 144. The angled wall insert 140 of FIG. 14 may be described as a curved annular wall insert (e.g., an outwardly curved annular wall insert or a convex annular wall insert). Although the illustrated embodiment shows the outer portion 144 having a greater radial distance (e.g., with respect to central axis 96) than the inner portion 146, in certain embodiments the outer portion 144 may have a smaller radial distance than the inner portion 146, such that the angle 147 is greater than 90 degrees. For example, the angled wall insert 140 may be inserted in an axially opposite configuration into the opening 120, such that the inner portion 146 is inserted first followed by insertion of the outer portion 144, wherein the orientation of the first and second mating portions 124 and 126 is similarly reversed in the axial direction to accommodate the angled wall insert 140. In other words, the angle 147 may be inclining or declining in an inward axial direction through the opening 120 into the fluid chamber 112.

Figure 15:
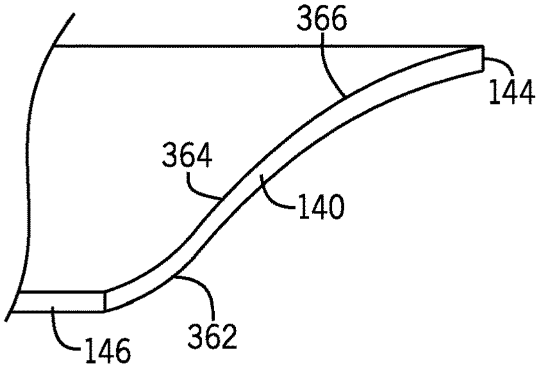
FIG. 15 is a partial cross-sectional view of an embodiment of the angled wall insert, illustrating a complex shape having aspects of FIGS. 12, 13, and 14.

FIG. 15 is a partial cross-sectional view of an embodiment of the angled wall insert 140, illustrating the angle 147 of the angled wall insert 140 varying between the inner portion 146 and the outer portion 144. In the illustrated embodiment, the angle 147 gradually changes (alternatingly increasing and decreasing) between the inner portion 146 and the outer portion 144. For example, the angled wall insert 140 of FIG. includes angled wall portions 452, 454, and 456, which differ from one another. In certain embodiments, the angled wall portions 452, 454, and 456 may include differently angled frustoconical wall portions as shown in FIG. 12, differently angled curved wall portions (e.g., inwardly curved annular wall portions) as shown in FIG. 13, differently angled curved wall portions (e.g., outwardly curved annular wall portions) as shown in FIG. 14, or any combination thereof. The angled wall insert 140 of FIG. may be described as a multi-angled, stepped, or complex angled annular wall insert. In the illustrated embodiment, the angled wall portion 452 may include an inwardly curved annular wall portion as shown in FIG. 13, the angled wall portion 454 may include a frustoconical wall portions as shown in FIG. 12, and the angled wall portion 456 may include an outwardly curved annular wall portion as shown in FIG. 14. Although the illustrated embodiment shows the outer portion 144 having a greater radial distance (e.g., with respect to central axis 96) than the inner portion 146, in certain embodiments the outer portion 144 may have a smaller radial distance than the inner portion 146, such that the angle 147 is greater than 90 degrees. For example, the angled wall insert 140 may be inserted in an axially opposite configuration into the opening 120, such that the inner portion 146 is inserted first followed by insertion of the outer portion 144, wherein the orientation of the first and second mating portions 124 and 126 is similarly reversed in the axial direction to accommodate the angled wall insert 140. In other words, the angle 147 may be inclining or declining in an inward axial direction through the opening 120 into the fluid chamber 112.

Technical effects of the disclosed embodiments include an improved piston with a reduced weight, a reduced risk of thermal distortions, and an improved cooling performance associated with the incorporation of the angled wall insert 140 into the piston 20, thereby defining the fluid chamber 112 (e.g., cooling gallery). The angled wall insert 140 defines a relatively thin wall as compared with walls of a cooling gallery formed only by casting the piston 20. The angled wall insert 140 also simplifies the construction process and avoids use of threaded fasteners (e.g., bolts) to form the cooling gallery. The angled wall insert 140 also enables a multi-piece construction of the piston 20 (e.g., top and body portions 40 and 148), wherein friction welding can be used to simultaneously couple together the top and body portions 40 and 148 while also retaining the angled wall insert 140.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:

a piston assembly, comprising:

a crown portion, comprising:

a crown;

an outer wall coupled to the crown, wherein the outer wall extends circumferentially about a central axis of the piston assembly;

a first inner wall disposed inside of the outer wall, wherein the first inner wall extends circumferentially about the central axis; and a first fluid chamber disposed radially between the outer wall and the first inner wall, wherein the first fluid chamber extends circumferentially about the central axis, an opening extends into the first fluid chamber in an axial inward direction, and the opening extends circumferentially about the central axis; and an angled wall insert disposed in the opening in the crown portion, wherein the angled wall insert extends circumferentially about the central axis, and the first fluid chamber is disposed axially between the crown and the angled wall insert;

wherein the angled wall insert comprises an angled annular plate, wherein the angled annular plate is oriented at an acute angle relative to the central axis; wherein the angled annular plate comprises a split at first and second circumferential end portions; wherein the first circumferential end portion comprises a first interlock, the second circumferential end portion comprises a second interlock, and the first and second interlocks are coupled together.

2. The system of claim 1, comprising a reciprocating piston machine having the piston assembly disposed in a cylinder.

3. The system of claim 2, wherein the reciprocating piston machine comprises a reciprocating piston engine.

4. The system of claim 1, wherein the outer wall comprises an annular outer wall, the first inner wall comprises a first inner annular wall, the first fluid chamber comprises a first annular fluid chamber.

5. The system of claim 1, wherein the angled annular plate comprises a frustoconical wall, a curved annular wall, or a combination thereof.

6. The system of claim 1, wherein the first circumferential end portion comprises a first tool interface, the second circumferential end portion comprises a second tool interface, and the first and second tool interfaces are configured to engage with a tool to radially compress or expand the angled annular plate.

7. The system of claim 1, wherein a plate thickness of the angled annular plate is less than an outer wall thickness of the outer wall along the first fluid chamber, a crown thickness of the crown along the first fluid chamber, and an inner wall thickness of the first inner wall along the first fluid chamber.

8. The system of claim 1, wherein the angled annular plate comprises an outer annular portion and an inner annular portion, wherein the angled annular plate is at least partially retained in the piston assembly via engagement between the outer annular portion and a first mating annular portion along an inner surface of the outer wall, engagement between the inner annular portion and a second mating annular portion along an outer surface of a first annular wall, or a combination thereof.

9. The system of claim 8, wherein the first mating annular portion comprises an outer annular groove or an outer annular shoulder along the inner surface of the outer wall, and the second mating annular portion comprises an inner annular groove or an inner annular shoulder along the outer surface of the first annular wall.

10. The system of claim 8, wherein the angled annular plate is at least partially retained in the piston assembly via a first friction interface between the outer annular portion and the inner surface of the outer wall, a second friction interface between the inner annular portion and the outer surface of the first annular wall, or a combination thereof.

11. The system of claim 8, wherein the angled annular plate is at least partially retained in the piston assembly via a first normal force exerted by the angled annular plate on a first tapered surface of the outer annular portion, a second normal force exerted by the angled annular plate on a second tapered surface of the inner annular portion, or a combination thereof.

12. The system of claim 8, wherein the angled annular plate is at least partially retained in the piston assembly via a first welded joint between the outer annular portion and the inner surface, a second welded joint between the inner annular portion and the outer surface, or a combination thereof.

13. The system of claim 8, wherein the angled annular plate is at least partially retained in the piston assembly via a friction weld distortion associated with a friction welded interface between the crown portion of the piston assembly and a body portion of the piston assembly, wherein the body portion comprises a skirt.

14. A method, comprising:

inserting an angled wall insert into an opening extending axially into a first fluid chamber of a piston assembly, wherein the piston assembly comprises a crown portion having a crown, an outer wall coupled to the crown, a first inner wall disposed inside of the outer wall, and the first fluid chamber disposed radially between the outer wall and the first inner wall, wherein each of the angled wall insert, the opening, the first fluid chamber, the outer wall, and the first inner wall extend circumferentially about a central axis of the piston assembly, wherein the first fluid chamber is disposed axially between the crown and the angled wall insert; and retaining the angled wall insert in the opening;

wherein the angled wall insert comprises an angled annular plate, wherein the angled annular plate is oriented at an acute angle relative to the central axis; wherein the angled annular plate comprises a split at first and second circumferential end portions; wherein the first circumferential end portion comprises a first interlock, the second circumferential end portion comprises a second interlock, and the first and second interlocks are coupled together.

15. The method of claim 14, wherein retaining the angled wall insert comprises retaining the angled wall insert radially between the outer wall and a first wall portion at least partially via a friction interface, a radial force, a first normal force along a top surface of the angled wall insert, a second normal force along a bottom surface of the angled wall insert, an annular groove, an annular shoulder, or a combination thereof.

16. The method of claim 15, wherein retaining the angled wall insert comprises retaining the angled wall insert radially between the outer wall and the first wall portion at least partially via a friction weld distortion associated with a friction welded interface between the crown portion of the piston assembly and a body portion of the piston assembly, wherein the body portion comprises a skirt.

17. A system, comprising:

a piston assembly kit, comprising at least one of:

a crown portion of a piston, wherein the crown portion comprises a crown, an annular outer wall, and an annular fluid chamber between the annular outer wall and a first inner wall, wherein the annular fluid chamber comprises an annular opening extending into the annular fluid chamber in an axial inward direction;

an angled annular insert configured to be received in the annular opening to form a wall of the annular fluid chamber;

wherein the angled annular insert comprises an angled annular plate, wherein the angled annular plate is oriented at an acute angle relative to a central axis of the crown portion; wherein the angled annular plate comprises a split at first and second circumferential end portions; wherein the first circumferential end portion comprises a first interlock, the second circumferential end portion comprises a second interlock, and the first and second interlocks are coupled together.

18. A system, comprising:

a piston assembly, comprising:

a crown portion, comprising:

a crown;

an outer wall coupled to the crown, wherein the outer wall extends circumferentially about a central axis of the piston assembly;

a first inner wall disposed inside of the outer wall, wherein the first inner wall extends circumferentially about the central axis; and a first fluid chamber disposed radially between the outer wall and the first inner wall, wherein the first fluid chamber extends circumferentially about the central axis, an opening extends into the first fluid chamber in an axial inward direction, and the opening extends circumferentially about the central axis; and an angled wall insert disposed in the opening in the crown portion, wherein the angled wall insert extends circumferentially about the central axis, and the first fluid chamber is disposed axially between the crown and the angled wall insert;

wherein the angled wall insert comprises an angled annular plate, wherein the angled annular plate is oriented at an acute angle relative to the central axis; wherein the angled annular plate comprises a split at first and second circumferential end portions; wherein the first circumferential end portion comprises a first tool interface, the second circumferential end portion comprises a second tool interface, and the first and second tool interfaces are configured to engage with a tool to radially compress or expand the angled annular plate.

19. A system, comprising:

a piston assembly, comprising:

a crown portion, comprising:

a crown;

an outer wall coupled to the crown, wherein the outer wall extends circumferentially about a central axis of the piston assembly;

a first inner wall disposed inside of the outer wall, wherein the first inner wall extends circumferentially about the central axis; and a first fluid chamber disposed radially between the outer wall and the first inner wall, wherein the first fluid chamber extends circumferentially about the central axis, an opening extends into the first fluid chamber in an axial inward direction, and the opening extends circumferentially about the central axis; and an angled wall insert disposed in the opening in the crown portion, wherein the angled wall insert extends circumferentially about the central axis, and the first fluid chamber is disposed axially between the crown and the angled wall insert;

wherein the angled wall insert comprises an angled annular plate, wherein the angled annular plate is oriented at an acute angle relative to the central axis; wherein a plate thickness of the angled annular plate is less than an outer wall thickness of the outer wall along the first fluid chamber, a crown thickness of the crown along the first fluid chamber, and an inner wall thickness of the first inner wall along the first fluid chamber.

20. A system, comprising:

a piston assembly, comprising:

a crown portion, comprising:

a crown;

an outer wall coupled to the crown, wherein the outer wall extends circumferentially about a central axis of the piston assembly;

a first inner wall disposed inside of the outer wall, wherein the first inner wall extends circumferentially about the central axis; and a first fluid chamber disposed radially between the outer wall and the first inner wall, wherein the first fluid chamber extends circumferentially about the central axis, an opening extends into the first fluid chamber in an axial inward direction, and the opening extends circumferentially about the central axis; and an angled wall insert disposed in the opening in the crown portion, wherein the angled wall insert extends circumferentially about the central axis, and the first fluid chamber is disposed axially between the crown and the angled wall insert;

wherein the angled wall insert comprises an angled annular plate, wherein the angled annular plate is oriented at an acute angle relative to the central axis; wherein the angled annular plate comprises an outer annular portion and an inner annular portion, wherein the angled annular plate is at least partially retained in the piston assembly via engagement between the outer annular portion and a first mating annular portion along an inner surface of the outer wall, engagement between the inner annular portion and a second mating annular portion along an outer surface of a first annular wall, or a combination thereof; wherein the angled annular plate is at least partially retained in the piston assembly via a first welded joint between the outer annular portion and the inner surface, a second welded joint between the inner annular portion and the outer surface, or a combination thereof.

21. The system of claim 20, wherein the angled annular plate is at least partially retained in the piston assembly via a friction weld distortion associated with a friction welded interface between the crown portion of the piston assembly and a body portion of the piston assembly, wherein the body portion comprises a skirt.

* * * * *